United States Patent
Aphek

(10) Patent No.: US 9,704,058 B2
(45) Date of Patent: Jul. 11, 2017

(54) FLASH DETECTION

(71) Applicant: ELTA SYSTEMS LTD., Ashdod (IL)

(72) Inventor: Ori Aphek, Ramat Gan (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 14/625,210

(22) Filed: Feb. 18, 2015

(65) Prior Publication Data

US 2015/0242702 A1 Aug. 27, 2015

(30) Foreign Application Priority Data

Feb. 24, 2014 (IL) .......................................... 231111

(51) Int. Cl.
G06K 9/00 (2006.01)
G06K 9/46 (2006.01)
G06K 9/20 (2006.01)
G06T 1/60 (2006.01)
H04N 7/12 (2006.01)

(52) U.S. Cl.
CPC ....... G06K 9/4661 (2013.01); G06K 9/00476 (2013.01); G06K 9/00771 (2013.01); G06K 9/2018 (2013.01); G06T 1/60 (2013.01); H04N 7/12 (2013.01); G06K 2009/00738 (2013.01)

(58) Field of Classification Search
CPC .................................................. G06K 9/4661
See application file for complete search history.

(56) References Cited

U.S. PATENT DOCUMENTS

| 3,936,822 | A | 2/1976 | Hirschberg |
| 5,686,889 | A | 11/1997 | Hillis |
| 7,619,754 | B2 | 11/2009 | Riel et al. |
| 7,732,769 | B2 | 6/2010 | Snider et al. |
| 8,304,729 | B2 | 11/2012 | Snider et al. |
| 8,421,015 | B1 | 4/2013 | Scott et al. |
| 2007/0040062 | A1 | 2/2007 | Lau et al. |
| 2007/0125951 | A1* | 6/2007 | Snider ................ G06K 9/00771 250/363.03 |

(Continued)

FOREIGN PATENT DOCUMENTS

EP 2 582 131 A2 4/2013
WO 2007/056753 A2 5/2007

(Continued)

OTHER PUBLICATIONS

Jul. 3, 2015 extended Search Report issued in European Patent Application No. 15155800.4.

(Continued)

*Primary Examiner* — Oneal R Mistry
(74) *Attorney, Agent, or Firm* — Oliff PLC

(57) ABSTRACT

The present disclosure provides a method comprising: memorizing a sequence of high-resolution images of a scene in a buffer; obtaining radiation emission readings from one or more photo detectors; detecting a suspected flash event based on processing the radiation emission readings from the one or more photo detectors, wherein said detecting occurs at a first instant; retrieving from the buffer high-resolution images of the scene including at least one image that was captured prior to said first instant; and processing the high-resolution images of the scene to determine a geolocation of the suspected flash event.

19 Claims, 12 Drawing Sheets

(56) References Cited

U.S. PATENT DOCUMENTS

| | | | | |
|---|---|---|---|---|
| 2010/0278387 A1* | 11/2010 | Agurok | ................... | F41H 13/00 |
| | | | | 382/103 |
| 2011/0170798 A1 | 7/2011 | Tidhar | | |
| 2014/0184793 A1* | 7/2014 | Cole | ................... | G06K 9/00771 |
| | | | | 348/143 |
| 2016/0148363 A1* | 5/2016 | Phan | ....................... | G06T 7/001 |
| | | | | 348/142 |

FOREIGN PATENT DOCUMENTS

| | | |
|---|---|---|
| WO | 2008/129552 A1 | 10/2008 |
| WO | 2012/040157 A1 | 3/2012 |

OTHER PUBLICATIONS

Yarlagadda et al.; "Intuvision Event Detection System for TRECVID 2008;" 2008 TREC Video Retrieval Evaluation; Nov. 17, 2008; XP055331149; http://www-nlpir.nist.gov/projects/tvpubs/tv8.papers/intuvision.pdf.

* cited by examiner

FLASH DETECTION

FIELD OF THE INVENTION

The present invention is in the field of flash detection.

ACRONYMS

SWIR Short Wave Infra Red (1-2.5 μm)
Extended SWIR 1.8-2.5 μm
Lattice matched SWIR 1-1.7 μm
MWIR Mid Wave Infra Red (3-5 μm)
LWIR Long Wave Infra Red (8-14 μm)
NIR Near Infra Red (0.7-1.0 μm)
Vis Visible light (0.4-0.7 μm)
SBUV Solar Blind UV (0.24-0.28 μm)
Pd Probability of Detection
FAR False Alarm Rate
SCR Signal to Clutter Ratio
SNR Signal to Noise Ratio
FOV Field Of View
IFOV Instantaneous Field Of View

BACKGROUND

U.S. Pat. No. 8,304,729 to Snider proposes methods, systems and apparatuses that detect, classify and locate flash events. In some implementations, some of the methods detect a flash event, trigger an imaging system in response to detecting the flash event to capture an image of an area that includes the flash event, and determines a location of the flash event.

U.S. Pat. No. 8,421,015 to Scott et al., discloses an event detection and classification system which uses a type of optical sensing component, a Position Sensing Detector Focal Plane Array (PSD-FPA). The PSD-FPA provides for high-speed operation that allows for accurate sensing of fast artifacts that are unique to weapons fire and enables precise location of optical phenomenon. The system detects and classifies events, particularly weapons fire, and rejects false alarms. An optical lens sub-system focuses light onto a PSD-FPA, which senses the photons and generates electrical signals associated with individual elements of the PSD-FPA. These signals are processed to identify and classify weapons-related or other events. Background subtraction, variable gain, time-intensity and time-location correlation, digital filtering, Fourier analysis, and wavelet analysis are all used to successfully classify the events while rejecting false alarms.

U.S. Pat. No. 7,619,754 to Riel et al. discloses curved sensor array configurations and methods of processing the data gathered by the sensors. A 2 dimensional embodiment comprises singular ring of sensors that can monitor sources in a 2 dimensional plane. A sensor directly facing a target produces a maximum response. As the angle of a sensor relative to the target increases, the response decreases. Fitting the sensor response amplitudes to a 2D Gaussian curve and calculating the peak of the curve allows a very accurate calculation of the angular direction of the target. A 3D embodiment comprises sensors distributed over the surface of a sphere in order to monitor multiple targets in any spatial orientation. Again, the sensor amplitude data is fitted to a 3D curve or surface such as a Gaussian surface. The present invention can resolve more than one target using deconvoluting techniques.

U.S. Pat. No. 3,936,822 to Hirschberg discloses a round detecting method and apparatus for automatically detecting the firing of weapons, such as small arms, or the like. Radiant and acoustic energy produced upon occurrence of the firing of the weapon and emanating from the muzzle thereof are detected at known, substantially fixed, distances therefrom. Directionally sensitive radiant and acoustic energy transducer means directed toward the muzzle to receive the radiation and acoustic pressure waves therefrom may be located adjacent each other for convenience. In any case, the distances from the transducers to the muzzle, and the different propagation velocities of the radiant and acoustic waves are known. The detected radiant (e.g. infrared) and acoustic signals are used to generate pulses, with the infrared initiated pulse being delayed and/or extended so as to at least partially coincide with the acoustic initiated pulse; the extension or delay time being made substantially equal to the difference in transit times of the radiant and acoustic signals in traveling between the weapon muzzle and the transducers. The simultaneous occurrence of the generated pulses is detected to provide an indication of the firing of the weapon. With this arrangement extraneously occurring radiant and acoustic signals detected by the transducers will not function to produce an output from the apparatus unless the sequence is correct and the timing thereof fortuitously matches the above-mentioned difference in signal transit times. If desired, the round detection information may be combined with target miss-distance information for further processing and/or recording.

U.S. Pat. No. 5,686,889 to Hillis described how firing of small arms results in a muzzle flash that produces a distinctive signature conducive to automated or machine-aided detection with an IR (infrared) imager. The muzzle flash is intense and abrupt in the 3 to 5 μm band. A sniper detection system operating in the 3 to 5 μm region must deal with the potential problem of false alarms from solar clutter. Hillis proposes to reduce the false alarm rate of an IR based muzzle flash or bullet tracking system (during day time) by adding a visible light (standard video) camera. The standard video camera helps detect (and then discount) potential sources of false alarm caused by solar clutter. If a flash is detected in both the IR and the visible spectrum at the same time, then the flash is most probably the result of solar clutter from a moving object. If a flash is detected only in the IR, then it is most probably a true weapon firing event.

US Patent Application Publication No. 2011/0170798 to Tidhar discloses a device and a method for use in detection of a muzzle flash event. The device can include a Photo Detector Array (PDA), sensitive in at least a portion of the NIR and SWIR spectrum, and a filter of electromagnetic radiation selectively passing in this portion a spectral range of low atmospheric transmission, the PDA has an integration time shorter than a duration of the muzzle flash event.

SUMMARY

In accordance with an aspect of the presently disclosed subject matter, there is provided a method comprising:
  memorizing a sequence of high-resolution images of a scene in a buffer;
  obtaining radiation emission readings from one or more photo detectors;
    detecting a suspected flash event based on processing the radiation emission readings from the one or more photo detectors, wherein said detecting occurs at a first instant; and retrieving from the buffer high-resolution images of the scene including at least one image that was captured prior to the first instant;

processing the high-resolution images of the scene to determine a geolocation of the suspected flash event.

In addition to the above features, the method according to this aspect of the presently disclosed subject matter can optionally comprise one or more of features listed below as different embodiments, in any desired combination or permutation.

In accordance with an embodiment of the presently disclosed subject matter, the method further comprises operating a high-resolution camera which captures the high-resolution images independently from the photodetectors, and from a detection of a suspected flash event.

In accordance with an embodiment of the presently disclosed subject matter, the method further comprises capturing the high-resolution images continuously regardless of a detection of a suspected flash event.

In accordance with an embodiment of the presently disclosed subject matter, wherein at least one of the high-resolution images retrieved from the buffer precedes the appearance of the suspected flash event.

In accordance with an embodiment of the presently disclosed subject matter, wherein a sampling rate of the photo detectors is higher than the frame rate of the high-resolution camera.

In accordance with an embodiment of the presently disclosed subject matter, wherein a sampling rate of the photo detectors is at least 5 times higher than the frame rate of the high-resolution camera.

In accordance with an embodiment of the presently disclosed subject matter, wherein the photo detectors operate at a cut-off wavelength which is higher than the cut-off wavelength of the high-resolution camera.

In accordance with an embodiment of the presently disclosed subject matter, wherein the I-FOV of the high-resolution camera is at least 10 times smaller in at least one axis than the FOV of at least one of the one photo detector.

In accordance with an embodiment of the presently disclosed subject matter, wherein the photo detectors operates with a cut-off wavelength within the extended SWIR range, which is between 1.8 µm to 2.5 µm, above the Lattice Matched SWIR cuttof of 1.7 µm In accordance with an embodiment of the presently disclosed subject matter, wherein the high-resolution camera operates with a cut-off wavelength within the SWIR range.

In accordance with an embodiment of the presently disclosed subject matter, wherein the high-resolution camera is adapted to capture radiation mainly within an atmospheric absorption band.

In accordance with an embodiment of the presently disclosed subject matter, wherein the high-resolution camera operates with a cut-off wavelength within the NIR range.

In accordance with an embodiment of the presently disclosed subject matter, wherein the high-resolution camera is a bolometric camera.

In accordance with an embodiment of the presently disclosed subject matter, wherein processing the radiation emission readings from the one or more photo detectors comprises spectral domain processing.

In accordance with an embodiment of the presently disclosed subject matter, wherein processing the radiation emission readings from the one or more photo detectors comprises intra-flash time-domain processing.

In accordance with an embodiment of the presently disclosed subject matter, wherein processing the radiation emission readings from the one or more photo detectors comprises total energy processing.

In accordance with an embodiment of the presently disclosed subject matter, wherein the spectral domain processing comprises processing radiation emission readings captured over a majority of a duration of the suspected flash event.

In accordance with an embodiment of the presently disclosed subject matter, wherein the intra-flash time-domain processing comprises processing radiation emission readings captured over a majority of a duration of the suspected flash event.

In accordance with an embodiment of the presently disclosed subject matter, further comprising determining based on a processing of the radiation emission readings from the one or more photo detectors, and based on a processing of the selected images, whether the suspicious flash event is an event of interest or not.

In accordance with an embodiment of the presently disclosed subject matter, further comprising determining based on a processing of the selected images whether the suspicious flash event is an event of interest or not.

In accordance with an embodiment of the presently disclosed subject matter, wherein processing of the selected images comprises: spatial domain processing and temporal-spatial processing.

In accordance with an embodiment of the presently disclosed subject matter, wherein capturing the high-resolution images comprises operating the high-resolution camera with an inter-exposure interval that is shorter than the shortest possible pulse duration of a suspected flash event.

In accordance with an embodiment of the presently disclosed subject matter, wherein capturing the high-resolution images comprises operating the high-resolution camera at wavelength band which is different from the wavelength band at which any one of the photo detectors operate, and wherein the determining whether the suspicious flash event is an event of interest or not comprises cross wavelength band processing.

In accordance with an embodiment of the presently disclosed subject matter, wherein the obtaining radiation emission readings from one or more photo detectors, comprises obtaining a plurality of radiation emission readings from the one or more photo detectors during a flash duration, and comparing attributes of the plurality of radiation emission readings to a library of flashes.

In accordance with an embodiment of the presently disclosed subject matter, wherein the radiation from at least two FOVs is superimposed to provide a single high-resolution image, and wherein the geolocation is determined using information about a rough geolocation obtained from the one or more photo detectors which provided the radiation emission readings.

In accordance with an aspect of the presently disclosed subject matter, there is yet further provided a method comprising:
  memorizing a sequence of high-resolution images of a scene in a buffer;
  obtaining radiation emission readings from one or more photo detectors;
  detecting a suspected flash event based on processing the radiation emission readings from the one or more photo detectors, wherein the detecting occurs at a first instant; and
  retrieving from the buffer high-resolution images of the scene including at least one image that was captured prior to the first instant;

processing the high-resolution images of the scene to determine whether the suspected flash event is an event of interest or not.

In addition to the above features, the method according to this aspect of the presently disclosed subject matter can optionally comprise one or more of features listed below as different embodiments, in any desired combination or permutation.

In accordance with an embodiment of the presently disclosed subject matter, the method further comprising operating a high-resolution camera which captures the high-resolution images independently from the photodetectors, and from a detection of a suspected flash event.

In accordance with an embodiment of the presently disclosed subject matter, the method further comprises capturing the high-resolution images continuously, regardless of a detection of a suspected flash event.

In accordance with an embodiment of the presently disclosed subject matter, wherein at least one of the high-resolution images retrieved from the buffer precedes the appearance of the suspected flash event.

In accordance with an embodiment of the presently disclosed subject matter, wherein a sampling rate of the photo detectors is higher than the frame rate of the high-resolution camera.

In accordance with an embodiment of the presently disclosed subject matter, wherein a sampling rate of the photo detectors is at least 5 times higher than the frame rate of the high-resolution camera.

In accordance with an embodiment of the presently disclosed subject matter, wherein the photo detectors operate at a cut-off wavelength which is higher than the cut-off wavelength of the high-resolution camera.

In accordance with an embodiment of the presently disclosed subject matter, wherein the I-FOV of the high-resolution camera is at least 10 times smaller in at least one axis than the FOV of at least one of the one or more photodetectors.

In accordance with an embodiment of the presently disclosed subject matter, wherein the photodetector operates with a cut-off wavelength within the extended SWIR range.

In accordance with an embodiment of the presently disclosed subject matter, wherein the high-resolution camera operates with a cut-off wavelength within the SWIR range.

In accordance with an embodiment of the presently disclosed subject matter, wherein the high-resolution camera is adapted to capture radiation mainly within an atmospheric absorption band.

In accordance with an embodiment of the presently disclosed subject matter, wherein the high-resolution camera operates with a cut-off wavelength within the NIR range.

In accordance with an embodiment of the presently disclosed subject matter, wherein the high-resolution camera is a bolometric camera.

In accordance with an embodiment of the presently disclosed subject matter, wherein processing the radiation emission readings from the one or more photodetectors comprises spectral domain processing.

In accordance with an embodiment of the presently disclosed subject matter, wherein processing the radiation emission readings from the one or more photo detectors comprises intra-flash time-domain processing.

In accordance with an embodiment of the presently disclosed subject matter, wherein processing the radiation emission readings from the one or more photo detectors comprises total energy processing.

In accordance with an embodiment of the presently disclosed subject matter, wherein the spectral domain processing comprises processing radiation emission readings captured over a majority of a duration of the suspected flash event.

In accordance with an embodiment of the presently disclosed subject matter, wherein the intra-flash time-domain processing comprises processing radiation emission readings captured over a majority of a duration of the suspected flash event.

In accordance with an embodiment of the presently disclosed subject matter, further comprising determining based on a processing of the radiation emission readings from the one or more photo detectors, and based on a processing of the selected images, a geolocation of the event of interest.

In accordance with an embodiment of the presently disclosed subject matter, the method further comprises determining based on a processing of the selected images a geolocation of the event of interest.

In accordance with an embodiment of the presently disclosed subject matter, wherein processing of the selected images comprises: spatial domain processing and temporal-spatial processing.

In accordance with an embodiment of the presently disclosed subject matter, wherein capturing the high-resolution images comprises operating the high-resolution camera with an inter-exposure interval that is shorter than the shortest possible pulse duration of a suspected flash event.

In accordance with an embodiment of the presently disclosed subject matter, wherein capturing the high-resolution images comprises operating the high-resolution camera at wavelength band which is different from the wavelength band at which any one of the photo detectors operate, and wherein determining whether the suspicious flash event is an event of interest or not comprises cross wavelength band processing.

In accordance with an embodiment of the presently disclosed subject matter, wherein the obtaining radiation emission readings from one or more photo detectors, comprises obtaining a plurality of radiation emission readings from the one or more photo detectors during a flash duration, and comparing attributes of the plurality of radiation emission readings to a library of flashes.

In accordance with an embodiment of the presently disclosed subject matter, wherein the radiation from at least two FOVs is superimposed to provide a single high-resolution image, and wherein the geolocation is determined using information about a rough geolocation obtained from the one or more photo detectors which provided the radiation emission readings.

In accordance with an aspect of the presently disclosed subject matter, there is yet further provided a system comprising:
 a frame buffer capable of memorizing a sequence of high-resolution images of a scene;
 one or more photodetectors capable of obtaining radiation emission readings from the scene;
 a controller is configured to detect a suspected flash event based on processing the radiation emission readings from the one or more photo detectors, wherein said detecting occurs at a first instant; and
 wherein the controller is configured to retrieve from the buffer high-resolution images of the scene including at least one image that was captured prior to the first instant, and wherein the controller is configured to process the high-resolution images of the scene to determine whether the suspected flash event is an event of interest or not.

In addition to the above features, the system according to this aspect of the presently disclosed subject matter can optionally comprise one or more of features listed below as different embodiments, in any desired combination or permutation.

In accordance with an embodiment of the presently disclosed subject matter, the system further comprises a high-resolution camera which is configured to capture the high-resolution images independently from the photodetectors, and from a detection of a suspected flash event.

In accordance with an embodiment of the presently disclosed subject matter, wherein the high-resolution camera is configured to capture the high-resolution images continuously, regardless of a detection of a suspected flash event.

In accordance with an embodiment of the presently disclosed subject matter, wherein at least one of the high-resolution images retrieved from the buffer precedes the appearance of the suspected flash event.

In accordance with an embodiment of the presently disclosed subject matter, wherein a sampling rate of the photo detectors is higher than the frame rate of the high-resolution camera.

In accordance with an embodiment of the presently disclosed subject matter, wherein a sampling rate of the photo detectors is at least 5 times higher than the frame rate of the high-resolution camera.

In accordance with an embodiment of the presently disclosed subject matter, wherein the photo detectors operate at a cut-off wavelength which is higher than the cut-off wavelength of the high-resolution camera.

In accordance with an embodiment of the presently disclosed subject matter, wherein the I-FOV of the high-resolution camera is at least 10 times smaller in at least one axis than the FOV of at least one of the one or more photodetectors.

In accordance with an embodiment of the presently disclosed subject matter, wherein the photo detector operates with a cut-off wavelength within the extended SWIR range.

In accordance with an embodiment of the presently disclosed subject matter, wherein the high-resolution camera operates with a cut-off wavelength within the SWIR range.

In accordance with an embodiment of the presently disclosed subject matter, wherein the high-resolution camera is adapted to capture radiation mainly within an atmospheric absorption band.

In accordance with an embodiment of the presently disclosed subject matter, wherein the high-resolution camera operates with a cut-off wavelength within the NIR range.

In accordance with an embodiment of the presently disclosed subject matter, wherein processing the radiation emission readings from the one or more photo detectors comprises spectral domain processing.

In accordance with an embodiment of the presently disclosed subject matter, wherein processing the radiation emission readings from the one or more photo detectors comprises intra-flash time-domain processing.

In accordance with an embodiment of the presently disclosed subject matter, wherein processing the radiation emission readings from the one or more photo detectors comprises total energy processing.

In accordance with an embodiment of the presently disclosed subject matter, wherein the spectral domain processing comprises processing radiation emission readings captured over a majority of a duration of the suspected flash event.

In accordance with an embodiment of the presently disclosed subject matter, wherein the intra-flash time-domain processing comprises processing radiation emission readings captured over a majority of a duration of the suspected flash event.

In accordance with an embodiment of the presently disclosed subject matter, wherein the controller is further configured to determine based on a processing of the radiation emission readings from the one or more photo detectors, and based on a processing of the selected images, a geolocation of the event of interest.

In accordance with an embodiment of the presently disclosed subject matter, wherein the controller is further configured to determine based on a processing of the selected images a geolocation of the event of interest.

In accordance with an embodiment of the presently disclosed subject matter, wherein processing of the selected images comprises: spatial domain processing and temporal-spatial processing.

In accordance with an embodiment of the presently disclosed subject matter, wherein the high-resolution camera is configured to have an inter-exposure interval that is shorter than the shortest possible pulse duration of a suspected flash event.

In accordance with an embodiment of the presently disclosed subject matter, wherein the high-resolution camera is configured to operate at wavelength band which is different from the wavelength band at which any one of the photo detectors operate, and wherein determining whether the suspicious flash event is an event of interest or not comprises cross wavelength band processing.

In accordance with an embodiment of the presently disclosed subject matter, wherein the photodetectors are adapted to obtain a plurality of radiation emission readings from the one or more photo detectors during a flash duration, and wherein the controller is configured to compare attributes of the plurality of radiation emission readings to a library of flashes.

In accordance with an embodiment of the presently disclosed subject matter, wherein the radiation from at least two FOVs is superimposed to provide a single high-resolution image, and wherein the controller is configured to determine the geolocation using information about a rough geolocation obtained from the one or more photodetectors which provided the radiation emission readings.

In accordance with an aspect of the presently disclosed subject matter, there is yet further provided a system comprising:

a frame buffer capable of memorizing a sequence of high-resolution images of a scene;

one or more photodetectors capable of obtaining radiation emission readings from the scene;

a controller is configured to detect a suspected flash event based on processing the radiation emission readings from the one or more photo detectors, wherein the detecting occurs at a first instant; and wherein the controller is configured to retrieve from the buffer high-resolution images of the scene including at least one image that was captured prior to the first instant, and wherein the controller is configured to process the high-resolution images of the scene to determine a geolocation of the suspected flash event.

In addition to the above features, the system according to this aspect of the presently disclosed subject matter can optionally comprise one or more of features listed below as different embodiments, in any desired combination or permutation.

In accordance with an embodiment of the presently disclosed subject matter, the system further comprises a high-resolution camera which is configured to capture the high-resolution images independently from the photo detectors, and from a detection of a suspected flash event.

In accordance with an embodiment of the presently disclosed subject matter, wherein the high-resolution camera is configured to capture the high-resolution images continuously regardless of a detection of a suspected flash event.

In accordance with an embodiment of the presently disclosed subject matter, wherein at least one of the high-resolution images retrieved from the buffer precedes the appearance of the suspected flash event.

In accordance with an embodiment of the presently disclosed subject matter, wherein a sampling rate of the photo detectors is higher than the frame rate of the high-resolution camera.

In accordance with an embodiment of the presently disclosed subject matter, wherein a sampling rate of the photo detectors is at least 5 times higher than the frame rate of the high-resolution camera.

In accordance with an embodiment of the presently disclosed subject matter, wherein the photo detectors operate at a cut-off wavelength which is higher than the cut-off wavelength of the high-resolution camera.

In accordance with an embodiment of the presently disclosed subject matter, wherein the I-FOV of the high-resolution camera is at least 10 times smaller in at least one axis than the FOV of at least one of the one or more photodetectors.

In accordance with an embodiment of the presently disclosed subject matter, wherein the photodetector operates with a cut-off wavelength within the extended SWIR range.

In accordance with an embodiment of the presently disclosed subject matter, wherein the high-resolution camera operates with a cut-off wavelength within the SWIR range.

In accordance with an embodiment of the presently disclosed subject matter, wherein the high-resolution camera is adapted to capture radiation mainly within an atmospheric absorption band.

In accordance with an embodiment of the presently disclosed subject matter, wherein the high-resolution camera operates with a cut-off wavelength within the NIR range.

In accordance with an embodiment of the presently disclosed subject matter, wherein the high-resolution camera is a bolometric camera.

In accordance with an embodiment of the presently disclosed subject matter, wherein processing the radiation emission readings from the one or more photo detectors comprises spectral domain processing.

In accordance with an embodiment of the presently disclosed subject matter, wherein processing the radiation emission readings from the one or more photo detectors comprises intra-flash time-domain processing.

In accordance with an embodiment of the presently disclosed subject matter, wherein processing the radiation emission readings from the one or more photo detectors comprises total energy processing.

In accordance with an embodiment of the presently disclosed subject matter, wherein the spectral domain processing comprises processing radiation emission readings captured over a majority of a duration of the suspected flash event.

In accordance with an embodiment of the presently disclosed subject matter, wherein the intra-flash time-domain processing comprises processing radiation emission readings captured over a majority of a duration of the suspected flash event.

In accordance with an embodiment of the presently disclosed subject matter, wherein the controller is further configured to determine based on a processing of the radiation emission readings from the one or more photo detectors, and based on a processing of the selected images whether the suspected flash event is an event of interest or not.

In accordance with an embodiment of the presently disclosed subject matter, wherein the controller is further configured to determine based on a processing of the selected images whether the suspected flash event is an event of interest or not.

In accordance with an embodiment of the presently disclosed subject matter, wherein processing of the selected images comprises: spatial domain processing and temporal-spatial processing.

In accordance with an embodiment of the presently disclosed subject matter, wherein the high-resolution camera is configured to have an inter-exposure interval that is shorter than the shortest possible pulse duration of a suspected flash event.

In accordance with an embodiment of the presently disclosed subject matter, wherein the high-resolution camera is configured to operate at wavelength band which is different from the wavelength band at which any one of the photo detectors operate, and wherein said determining the geolocation comprises cross wavelength band processing.

In accordance with an embodiment of the presently disclosed subject matter, wherein the photodetectors are adapted to obtain a plurality of radiation emission readings during a flash duration, and wherein the controller is configured to compare attributes of the plurality of radiation emission readings to a library of flashes.

In accordance with an embodiment of the presently disclosed subject matter, wherein the radiation from at least two FOVs is superimposed to provide a single high-resolution image, and wherein the controller is configured to determine the geolocation using information about a rough geolocation obtained from the one or more photo detectors which provided the radiation emission readings from the scene.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
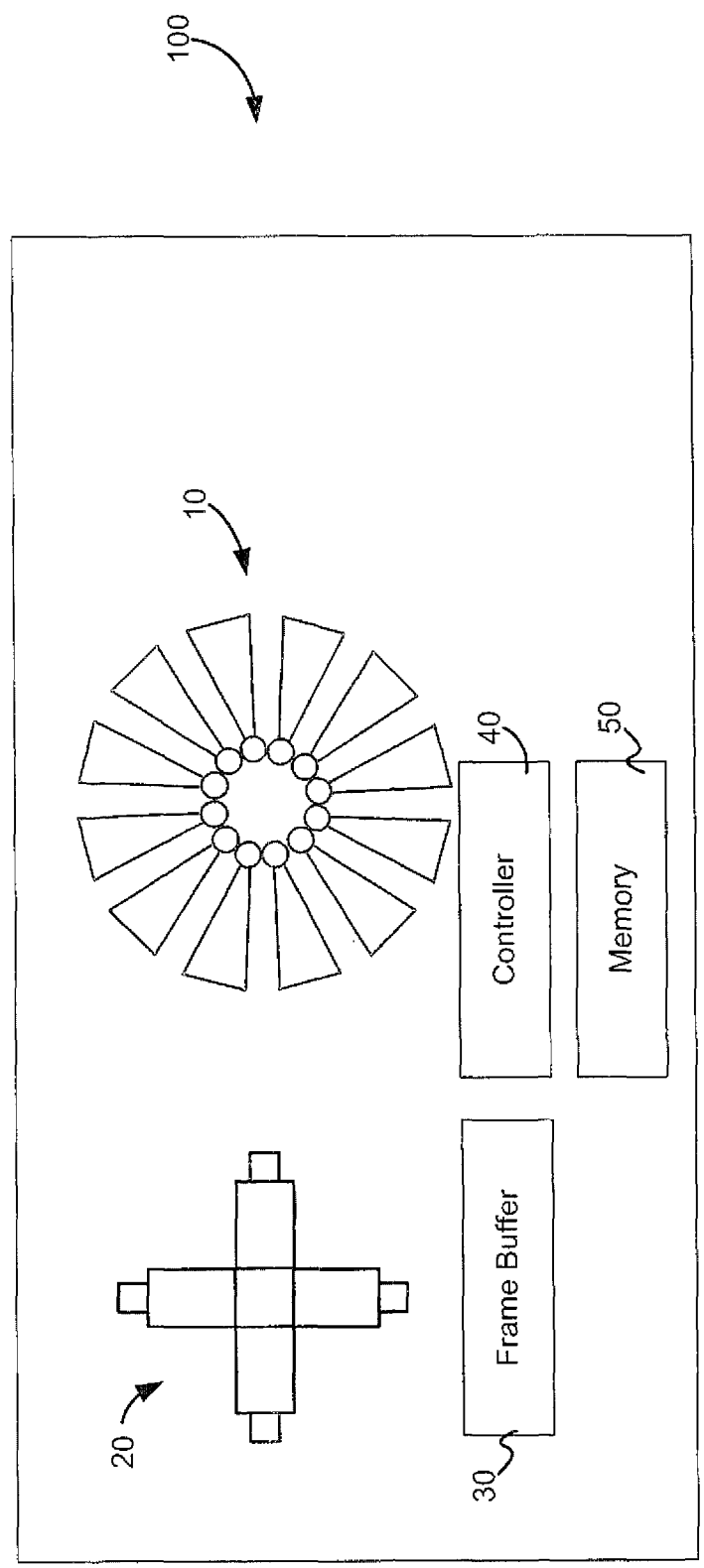
FIG. 1 is a functional block diagram illustration of a detection system according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION

In the following detailed description, numerous specific details are set forth in order to provide a thorough understanding of the presently disclosed subject matter. However, it will be understood by those skilled in the art that the presently disclosed subject matter may be practiced without some of these specific details. In other instances, well-known methods, procedures and components have not been described in detail so as not to obscure the presently disclosed subject matter.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

As used herein, the terms "example", "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

Unless specifically stated otherwise, as apparent from the following discussions, it is appreciated that throughout the specification discussions utilizing terms such as "processing", "memorizing", "detecting", "configuring", "selecting", "retrieving", "referencing", "indexing", "searching", "receiving", "storing" or the like, include actions and/or processes of a computer that manipulate and/or transform data into other data, said data represented as physical quantities, e.g., such as electronic quantities, and/or said data representing the physical objects.

The terms "computer", "processor", and "controller" or the like should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium.

In embodiments of the presently disclosed subject matter, fewer, more and/or different stages than those shown in FIG. may be executed. In embodiments of the presently disclosed subject matter one or more stages illustrated in FIGS. 4, 6 and 11 may be executed in a different order and/or one or more groups of stages may be executed simultaneously. FIGS. 1, 3, 8, 9 and 10 illustrate different schematics of the system architecture in accordance with an embodiment of the presently disclosed subject matter. Functional elements in FIGS. 1, 3, 8, 9 and 10 can be made up of any combination of software and hardware and/or firmware that performs the functions as defined and explained herein. In other embodiments of the presently disclosed subject matter, the system may optionally comprise fewer, more, and/or different modules than those shown in FIGS. 1, 3, 8, 9 and 10.

A single optical detection unit, which is sometimes a pixel within a lensed camera, has an Instantaneous Field Of View (IFOV) that collects radiation from the clutter (which may include short spikes of signals from sun glints and artificial sources), and from a flash if such exists in the IFOV. According to examples of the presently disclosed subject matter, distinguishing between the flash and the clutter may include a combination of some or all of the following criteria:

Spatial domain processing—a flash is almost always a sub-pixel event, which means that it accounts for a part of the IFOV. This means that the IFOV collects the collective radiation from the flash and the clutter. In some cases, the flash radiation may split between adjacent IFOVs. A signal which appears on more adjacent IFOVs is usually not a flash, unless it is very close to the sensor so that the size of the flash is bigger than the IFOV, or very intense, thus causing internal sensor phenomena such as blooming which cause the signal to appear in IFOVs which are not supposed to collect radiation from that flash.

Time-Spatial domain processing—this processing takes into account both spatial and time dependent signals, usually video-type signals, to identify movements such as birds flying, cars driving etc, in order to eliminate signals that appear to be flashes that appear on the course of the movements of these objects, but in fact result from the motion of such objects in the field of view.

Intra-pulse time domain processing—by sampling the flash several times during its presence, one may compare the intensity-time function of the flash to a library of flashes, or compare several attributes of the shape to characteristic attributes of flashes. This requires sampling the flash several times during its presence. This may be difficult if a large (about 100,000 pixels) array of photodetectors is used. This is because the duration of a light arms muzzle flash is less than a millisecond. Sampling the flash ten times requires higher than 10,000 Frames Per Second (FPS). This results in 1 Giga Pixel per second camera in the infrared (LWIR, MWIR or SWIR) or SBUV—which is far beyond today's available technology, and may certainly be bulky and expensive (see analysis in U.S. Pat. No. 8,304,729 to Snider). Note that the requirement for intra pulse time domain processing is 10 times higher than the sampling rate required for the total flash energy analysis. This further excludes uncooled LWIR photodetector(s) for this purpose.

Spectral domain processing—the optical spectrum of flashes usually peaks between 3-5 microns. Sun glints are more powerful in the visible light as the sun illumination peaks in the green wavelength, and diminish in power with the increasing wavelength in the infrared. Comparing the signal intensity in the infrared and visible, or between different wavelength bands in the infrared or between the SBUV and other wavelength bands helps distinguishing between flashes and sun glints and other radiation sources with different from flashes spectral attributes. (see U.S. Pat. No. 5,686,889)

According to an aspect of the presently disclosed subject matter, there is provided a method which can be used for detecting an event of interest that is characterized by a predefined optical signature. According to examples of the presently disclosed subject matter, the method can include: capturing images of a scene using a high-resolution camera, memorizing a sequence of high-resolution images of the scene, obtaining radiation emission readings from one or more photo detectors, processing the radiation emission readings from the one or more photo detectors for detecting radiation emission readings which correspond to a suspicious flash event, wherein detecting radiation emission readings which correspond to a suspicious flash event occurs at a first instant, and selecting from the sequence of high-resolution images of the scene at least a first image which includes readings of radiation emission from the detected suspicious flash event, and at least a second image which includes readings of radiation emission which is not characteristic of the flash event, and wherein at least one of the first or the second images was captured prior to the first instant.

According to examples of the presently disclosed subject matter, the method can further include determining at least based on the first and second images whether the suspicious flash event is an event of interest or not.

According to examples of the presently disclosed subject matter, the method can further include determining the geolocation of the suspected flash event at least based on the first and second images.

Reference is now made to FIG. 1, which is a block diagram illustration of a detection system according to examples of the presently disclosed subject matter. According to examples of the presently disclosed subject matter, the detection system 100 can include one or more photodetector units 10, one or more imaging units 20, a frame buffer 30, a processor 40 and memory 50.

According to examples of the presently disclosed subject matter, the photodetector(s) 10 are configured to detect a suspected flash event. By way of example, the photodetector(s) 10 can include one or a plurality (e.g., two, three, . . . , n) of photo photodetectors. The photodetector(s) 10 can be a single band photodetector or a multiple band (e.g., band I and band II) photodetector or a multiple band photodetector array. According to examples of the presently disclosed subject matter, the photodetectors can operate at a first band (band I) in which the appearance of solar radiation (used here as an example of a not-of-interest event) is relatively strong compared to the appearance of solar radiation in the second band (band II), and in the second band (band II) the appearance of an event of interest is relatively strong compared to the appearance of the event of interest in the first band (band I).

For example, the photodetector(s) 10 can be capable of operating in the extended short wave infrared band, and possibly also in the visible and/or near infrared ("NIR") bands. In further examples of the presently disclosed subject matter, the photodetector(s) can be capable of detecting or of providing radiation emission readings in the mid-wave infrared ("MWIR") or in the Solar Blind Ultra Violet ("SBUV") bands.

It is noted that while SWIR photodetectors are usually less complex and less costly to implement in a flash detection system, compared to MWIR photodetectors, MWIR photodetectors can typically achieve better Pd and FAR compared to SWIR photodetectors. In fact, in some cases, the Pd and FAR that can be typically achieved using SWIR photodetectors may be unacceptable for some flash detection applications. The choice of photodetector technology therefore depends on the characteristics of flashes to be detected, price sensitivity, power consumption requirements, performance requirements and detection system design. Some examples of the detection and method disclosed herein take advantage of a detection and geolocation algorithm (which can be implemented in control logic and executed by hardware components) that has the following features:

A. A two phase detection process (more phases are also possible) that includes: a suspected flash event detection phase, and an event of interest validation phase (in which the initial, suspected flash event, is validated (or dismissed) and the geolocation of the event is determined);

B. The operation of the imaging unit (e.g., high-resolution camera), which is used in the event of interest validation phase is independent from the operation of the photodetectors, which are used in the suspected flash event detection phase (and can also be used in the event of interest validation phase). In particular, the high-resolution camera can operate continuously and independently from the operation of the photodetectors. The imaging unit has an inter-exposure interval that is shorter than the shortest possible pulse duration of an event of interest, and so there is effectively no risk that by the time the imaging unit is activated the flash will have already disappeared.

C. Continuous storage of images from the imaging in a buffer. The storing of images in the buffer is also independent from the operation of the photodetectors. The reading of images from the buffer is based on processing of samples from the photodetectors. Thus, images which predate the detection of the suspected flash event are available for use in the event of interest validation phase. In addition, images that precede and/or succeed the suspected flash event are available for use in the event of interest validation phase.

D. The processing of the samples from the photodetectors and the detection of a suspected flash event provide a temporal reference (e.g., including start time and duration of a suspected flash event) and possibly also a rough spatial reference. The temporal reference, and if provided, the spatial reference, can be used to retrieve images from the buffer and initiate an event of interest validation phase.

The inventors of the presently disclosed subject matter, have discovered that the above features enable a greater tolerance to low SCR, and subsequently, a more favorable cost-to-performance tradeoff is made possible. The greater low-SCR tolerance can provide flexibility in terms of the choice of technology which can be used in the flash detector. Thus, according to examples of the presently disclosed subject matter, SWIR photodetectors can be used for detecting suspected flash events.

It should also be noted that the use of SWIR and more particularly, the high frame rate which is more straightforward to achieve with un-cooled imaging unit (e.g., camera) technology such as InGaAs in the Lattice Matched SWIR band (or CMOS camera in the NIR) can also be regarded as a feature. When taking such a perspective, some of the detection and geolocation algorithm features mentioned above, can be regarded as an outcome of the high frame rate of the proposed un-cooled, high frame rate, imaging unit.

There is now provided a description of certain features in examples of the presently disclosed subject matter that allow for more relaxed photodetectors' SCR (per-sample) requirements, and thus provide greater flexibility with respect to the choice of the type of photodetectors that can be used in the detection process.

According to examples of the presently disclosed subject matter, the imaging unit that produces the high-resolution images operates continuously and independently from the operation of the photodetectors. The images from the imaging unit are recorded in a buffer, and in case a suspicious flash event is detected by the photodetectors, two or more images are retrieved, where at least one of the images is retrieved from the buffer and at least one more image is retrieved either from the buffer or directly from the camera. The term "buffer" is used here for convenience only, and in some cases, the description makes a general reference to the term "memory" when referring to the computer resource that is used for storing (or memorizing) an image that was taken by the two images. Thus, in this context, the terms buffer and memory are interchangeable.

The time budget that can be allocated for the provisional detection by the photodetectors (the suspected flash event detection phase) is thus significantly longer compared to a solution, where the photodetectors act as a trigger for the imaging unit (such as in US20120001071), because the images are captured continuously and independently from the operation of the photodetectors, and the imaging unit has an inter-exposure interval that is shorter than a pulse duration of an event of interest, and so there is effectively no risk that by the time the imaging unit is activated the flash will have already disappeared. For example, samples from the photodetectors which are collected over a majority of the duration of an optical event can be made available to and used by the suspected flash event detection algorithm to determine whether an optical event is a suspected flash event or not. By way of example, the suspected flash event detection algorithm can obtain and use samples from the photodetectors which cover the entire duration (or a majority of the duration) of the event and possibly also some time afterwards or before the optical event. It would be appreciated, that such information cannot be made available in a system that implemented a trigger-based imaging unit activation, where the decision to trigger the imager must be taken at the beginning of the event, so that the imager to be triggered can still capture most of the event.

Furthermore, the samples from the photodetector(s) only provide a provisional detection of a suspected flash event, and the conclusion that a detected flash event is indeed an event of interest (or that it is a not-of-interest event) is based on assessment of processed high-resolution images (possibly in combination with an assessment of the photodetector(s) samples). In other words, according to examples of the presently disclosed subject matter, the data from the photodetector(s) is augmented by processed images, and the processed images are used to validate a provisional assessment (that is based on the data from the photodetector(s)) that a certain optical event is a suspected flash event. For example, the analysis of the images from the imager can indicate the size of the event. An event which is captured by too many pixels is probably not an event of interest, and may be discarded despite the detection by the photodetector. Additional criteria which can be used in the suspected flash event detection phase shall be discussed below.

By way of example, the photodetector(s) 10 can include photodetector(s) that operate at a rate of between 2-20 kHz. The photodetector(s) can be configured to cover the system's 100 field of view ("FOV") or at least a predefined portion of the system' 100 FOV, e.g., a majority of the system's 100 FOV. In a further example, the coverage of the photodetector(s) can extend beyond the system's 100 FOV.

In the following description, for convenience and by way of example, reference is made to a single photodetector. However it should be noted that a plurality of photodetectors can be used, and that any reference made to a single photodetector applies to a multi-photodetector implementation, mutatis-mutandis.

Still in accordance with examples of the presently disclosed subject matter, the photodetector 10 can be adapted to operate in AC-coupled mode. Yet further by way of example, the photodetector diode area size and pixel FOV can be selected according to a link-budget parameter.

According to examples of the presently disclosed subject matter, the photodetector 10 can include a single (one) pixel, or in other example, the photodetector can utilize more than one pixel (e.g., two, three, . . . n pixels), but fewer than the number of pixels of an imaging unit 20 as described below.

One or more optical elements can also be included or otherwise combined with the photodetector 10, including for example, a lens, a spectral filter or a diffractive element. Furthermore, the photodetector 10 can also include additional electronics, such as a band pass filter and a pre-amplifier, AC coupler, bias subtraction, for example.

The signal from the photodetector(s) can be converted to a digital signal, and the digital signal can be processed to determine whether the radiation emission readings from the photodetector(S) correspond to a suspected flash event. For example, the memory unit 50 can hold a library of signatures of events of interest. The signatures can take on many forms. For example, each signature in the library can represent a different type of optical event (which is of interest).

The library can include various parameters about each of the flashes to be detected, or about a group or groups of flashes which constitute a single flash type in the library. For example, the library can hold signatures of different 5.56 mm caliber weapons as a single flash type or keep several 5.56 mm weapon signatures as separate entities.

The information stored about each flash source can include signature duration, total energy, time dependent intensity shape, rise time, fall time, number of peaks, spectral contrast (total energy spectral ratio, or time-dependent ratio), and other attributes which may enable the algorithm to distinguish between a flash and the background.

It would be appreciated that the detection of a suspected flash event can be performed entirely by the photodetector(s) 10, providing that the photodetectors have appropriate independent processing capabilities, or in another example, the samples from the photodetector(s) 10 can be processed by an external processing device or unit, for example, the processor 40. It should be noted, that the detection of a suspected flash event based on the photodetector's samples is a provisional step in the detection process of an event of interest.

According to examples of the presently disclosed subject matter, the photodetector's 10 sampling rate is such, that the sampling duration is less than the duration of a suspected flash event or of an event of interest. Preferably, the photodetector's sampling rate enables to obtain several (e.g., 5-10) samples of the shortest event of interest which can be detected by the system 100. Since light-arms muzzle-flash duration can be as low as a few tens of a millisecond when measured in the SWIR, sampling rate of 10-20 kHz can be a typical choice in a system according to examples of the presently disclosed subject matter.

Throughout the description and in the claims reference is made to the term "event of interest". The term "event of interest" as used herein relates to a flash event whose appearance is characterized by a signature that has certain characteristics. According to further examples of the presently disclosed subject matter, a signature of an event of interest can be characterized by the appearance of a cloud of hot gasses and particles, which appears at the moment of a projectile's launch, remains for a certain duration and dissolves. The temperature of a flash varies between different types of flashes and with time. In general, the temperature is of the order of 1000° C. The cloud emits radiation in the optical (muzzle-flash) and acoustic (muzzle-blast) domains. The optical radiation is distributed over the entire spectrum. It peaks in MWIR, as the blackbody radiation of the particle peaks there, and is joined by $CO_2$ radiative gas relaxation. The radiation intensity diminishes but remains significant in the long part of the SWIR range (extended SWIR, 1.8-2.5 µm). The intensity declines with the shortening wavelength through the Lattice Matched SWIR, NIR, VIS and SBUV. In contrast, the solar energy increases with the wavelength from green light to the MWIR. Therefore, VIS or NIR are preferred as reference wavelength bands to SWIR or MWIR: the SWIR and MWIR serve as the prime detection band, and the VIS or NIR are used to compare the signal intensity (a reference detection band): in a flash event, the longer wavelengths will be more powerful than the shorter, and vice versa for sun glints.

The duration of a flash varies among different flash types: light arms muzzle flashes are relatively short: less than a millisecond. Rockets and larger caliber guns can last several milliseconds to low hundreds or milliseconds. The flash duration also varies with the wavelength band. In general, the shorter the wavelength, the shorter the flash duration. The short duration and low intensity of light arms muzzle flashes means that they are challenging to detect. Therefore, some of the examples in this disclosure are focused on detection of light arms (the event of interest is a light arms muzzle flash).

Nonetheless, examples of the presently disclosed subject matter are capable of detecting all relevant flashes in the environment. By providing appropriate suspected flash event criterion and event of interest criterion many types of flashes from various sources can be detected using the examples of the presently disclosed subject matter.

Figure 2:
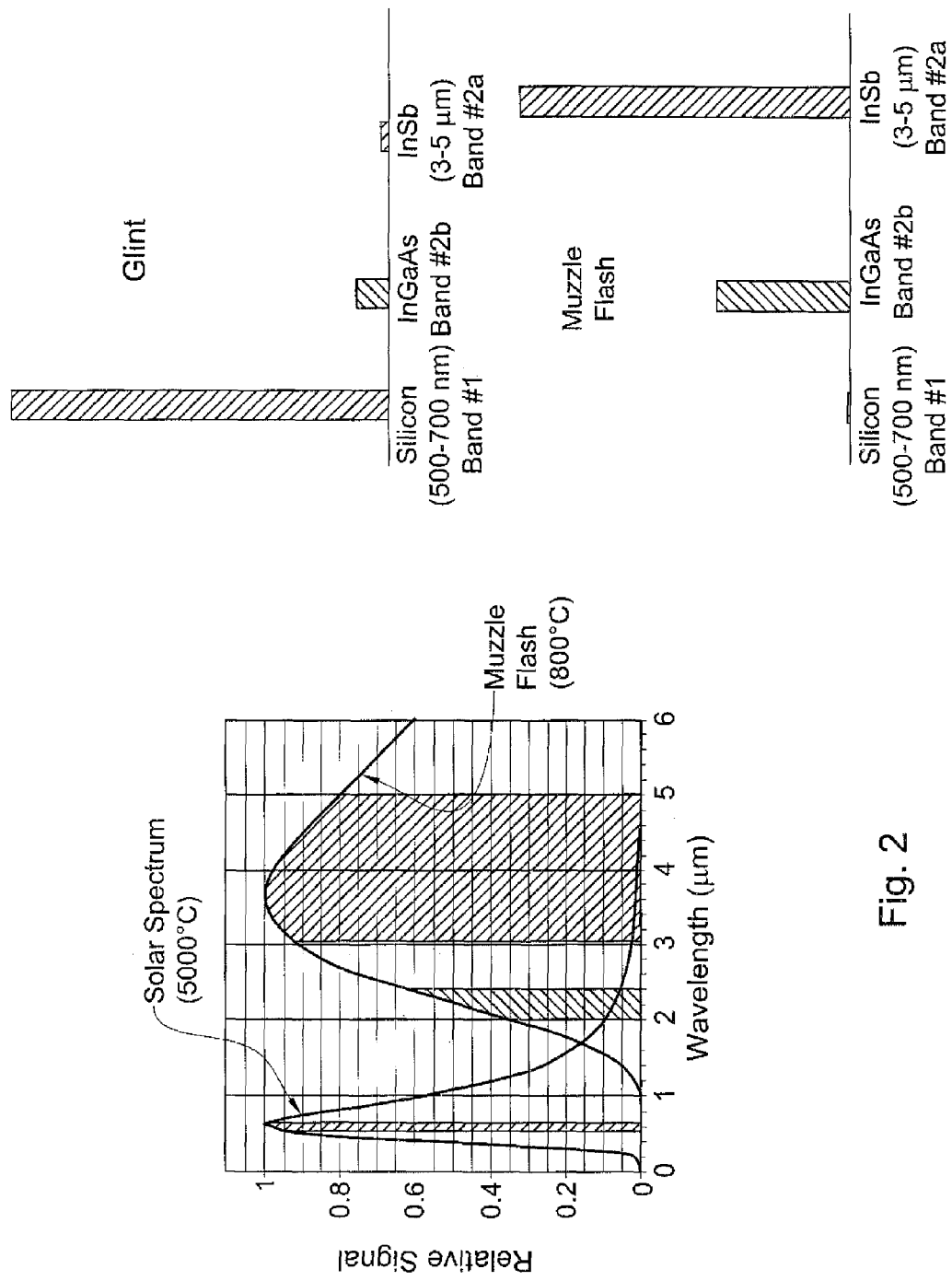
FIG. 2 presents a graph of spectral discrimination of a glint and an example muzzle flash, and graphical illustrations of signal strength of a glint and a muzzle flash detected by each of a silicon based detector, Indium gallium arsenide (InGaAs) detector and a Indium antimonide (InSb) detector, according to examples of the presently disclosed subject matter.

FIG. 2 presents a graph of spectral discrimination of a glint and an example muzzle flash, and graphical illustrations of signal strength of a glint and a muzzle flash detected by each of a silicon based detector, Indium gallium arsenide (InGaAs) detector and a Indium antimonide (InSb) detector. Some or all of the detector types used in the illustration in FIG. 2 may be used in a detection system according to examples of the presently disclosed subject matter, although other or additional detector types can also be used.

Throughout the description and in the claims, reference is made to the term "suspected flash event". The term "suspected flash event" as used herein relates to an optical event whose appearance is characterized by a signature (that has certain characteristics). According to examples of the presently disclosed subject matter, an optical signature of a suspected flash event can be characterized at least by a certain duration. A suspected flash event according to examples of the presently disclosed subject matter, is an event whose appearance is characterized by a short appearance or a short duration optical signature. A suspected flash event can be an event of interest or a not-of-interest event.

Examples of events which can be detected as suspected flash events, depending on the characteristics that are used to define a suspected flash event, include: muzzle flashes from small arms, muzzle flashes from machine guns, muzzle flashes from artillery, muzzle flashes from mortars artillery or any other barrel based weapon, plume resulting from the launch of a missile or a rocket, sun glints, battlefield explosions, car-lights, car backfire, camera flash, campfire etc.

According to examples of the presently disclosed subject matter, the processor 40 can be configured, possibly using instructions that are stored in the memory 50, to apply a predetermined suspected flash event criterion to samples provided by the photodetector 10 to determine whether a certain set of samples from the photodetectors indicate that a suspected flash event occurred. Further by way of example, in case it is determined that a suspected flash event occurred, the processor 40 can be configured, possibly using instructions that are stored in the memory 50, to apply a predetermined event of interest criterion to at least two high-resolution images provided by the imaging unit 20, and possibly also to the samples from the photodetector 10, to determine whether a suspected flash event is an event of interest or not.

The suspected flash event criterion and the event of interest criterion can be associated with certain characteristics of the suspected flash event. According to examples of the presently disclosed subject matter, provisionally, a suspected flash event is detected according to a first set of characteristics or attributes, and subsequently in case the suspected flash event is found to be characterized by a second set of characteristics or attributes, the flash event can be determined to be an event of interest (or a not-of-interest event). The first and the second sets of characteristics or attributes can include different levels of the same characteristics or attributes and/or altogether different/same characteristics or attributes. Examples of events which can be considered to be events of interest, depending on the characteristics or attributes that are used to define an event of interest and to configure the system 100, include: muzzle flashes from small arms, muzzle flashes from machine guns, muzzle flashes from artillery, muzzle flashes from mortars artillery or any other barrel based weapon, plume resulting from the launch of a missile or a rocket. However, it would be appreciated that in other cases, the system can be configured to classify sun glints, battlefield explosions, car-lights, car backfire, camera flash, campfire etc., as "not-of-interest" events. It would be appreciated, that throughout the description and in the claims, any reference that is made to an event of interest and to characteristics of such event can relate to a certain model, including a computerized or digital model of such events. The model of an event of interest can include various digital representations of certain characteristics of measure, simulated or otherwise generated events.

The criteria that is used in the detection process can be implemented by the processor 40. By way of example, the criteria can be stored in the memory unit 50 and can be utilized by the processor 40 to process the samples from the photodetector 10 and from the imaging unit 20.

Muzzleflashes from light arms, machine guns, cannons, mortars, launch flashes of rockets and missiles etc, emit optical energy in a wide wavelength band, typically peaking in the MWIR (3-5 microns), but still significant in the SWIR, and further declining through the NIR, VIS and eventually the SBUV band.

In order to detect a flash with a high Probability of Detection (Pd), while maintaining low false alarm rate (FAR) a flash detection system needs to distinguish the flash from the background signal (clutter) and from the noise (system internal noise and shot noise). Distinguishing the signal from the clutter requires sufficiently large Signal to Clutter Ratio (SCR), and sufficiently large Signal to Noise Ratio (SNR).

Still further by way of example the flash detection process can include some or all of the following criteria:

Total flash energy—aggregate the energy collected from the flash above the clutter, and generate a threshold. A flash can be more powerful than other clutter related events, however, in some cases sun glints can be more powerful than light arm muzzleflashes, and close sun glints can appear more powerful than far away flashes, even when the flashes are powerful, such as rocket launch flash. Therefore, intensity related criteria may not suffice in applications where low false alarm is required. The accurate measurement of flash energy is strongly dependent on clutter subtraction. The SCR strongly depends on the residual clutter that remains after the subtraction. The SCR is mostly affected by the resolution, choice of spectrum and sampling rate—which is optimal when integration time is equal or shorter than flash duration. If integration time is longer than the flash duration, then it collects unnecessary time-dependent clutter. Therefore, it is important that the integration time is as close as possible to the shortest flash to be detected.

Spatial domain—a flash can be assumed to be a sub-pixel event, which means that it accounts for a part of the IFOV. This means that the TOY collects the collective radiation from the flash and the clutter. In some cases, the flash radiation is split between adjacent IFOVs. A signal which appears on more adjacent IFOVs can be assumed to not likely be a flash. This analysis would usually be considered together with other criteria, since it is not conclusive evidence with respect to the nature of the detected optical event. For example, despite what was described above, under certain circumstances a flash may be manifest across several IFOVs, e.g., when it occurs very close to the sensor so that the size of the flash is bigger than the IFOV, or when the flash is very intense, thus causing internal sensor phenomena such as blooming which cause the signal to appear in IFOVs which are not supposed to collect radiation from that flash.

Time-Spatial domain processing—this processing takes into account both spatial and time dependent signals, usually video-type signals, to identify movements such as birds flying, cars driving etc, in order to eliminate signals (optical events) that appear to be (suspected) flash events, but in fact result from reflection that occurs while such objects are in motion within the field of view. When the reflecting object is moving behind a chopping object (a grove of trees, or a fence for example) the reflection can be modulated in a manner which appears to the photodetectors, at least in some respects (e.g., energy vs. time) as if it were a flash event (or an event of interest). Typically, time-Spatial domain processing such as a motion tracking algorithm can be effective for detecting a moving object in the field of view, attribute the suspected flash event to the moving object, and determine it to be a not-of-interest event. It would be appreciated that such time-Spatial domain processing may require high-speed (with respect to the flash duration, i.e., the inter-exposure interval is shorter than a pulse duration of an event of interest) video stream with multiple (e.g., tens to hundreds) frames in order to be effective.

Intra-pulse time domain processing—by sampling the flash several times during its presence, the intensity-time function of the flash can be compared, for example, to a library of flashes, or the intensity-time function of the flash can be compared to one or more attributes of the shape intensity time function of the optical event to characteristic (pre-stored) attributes of event(s) of interest. Such processing requires sampling the optical event several times during its presence. When considering some types of flash events which can be of interest, sampling rate of this magnitude can be difficult to achieve if a large (about 100,000 pixels) array camera is used. For example, the duration of a light arms muzzleflash is less than a millisecond, and sampling the flash ten times would require a frame rate that is higher than 10,000 Frames Per Second (FPS). This results in 1 Giga Pixel per second camera in the infrared (LWIR, MWIR or SWIR) or SBUV—which is beyond today's available technology, and will likely be bulky and expensive (see for example a similar analysis provided in U.S. Pat. No. 8,304,729 to Snider). Note that the requirement for intra pulse time domain processing is 10 times higher than the sampling rate required for the total flash energy analysis. This further excludes uncooled LWIR photodetectors for this purpose due to such photodetectors' long integration time (in the order of 10 milliseconds). Therefore, the requirement for sampling a light arms muzzle flash several times is contradictory to the requirement for spatial processing, and to the requirement for providing accurate bearing towards the flash, because high sampling rate reduces resolution.

Spectral domain processing—the optical spectrum of flashes usually peak between 3-5 microns, and decline with the wavelength. Sun glints are more powerful in the visible light as the sun illumination peaks in the green wavelength, and diminishes in power with the increasing wavelength in the infrared. Comparing the signal intensity in the infrared and visible bands or between different wavelength bands in the infrared or between the SBUV and other wavelength bands helps distinguishing between flashes and sun glints and other radiation sources which are different from flashes' spectral attributes. (see U.S. Pat. No. 5,686,889)

According to examples of the presently disclosed subject matter, the imaging unit(s) 20 includes one or more high resolution camera(s). For convenience, reference made in the present disclosure to an imaging unit or to a camera (in the singular form) may also refer to an implementation where multiple imaging units or multiple cameras, respectively, are used in the detection system, unless explicitly stated or implicitly apparent (from the context) otherwise.

Further by way of example, the high-resolution camera can have an array of more than 10,000 pixels, or, preferably more than 100,000, in order to enable sub degree of angular resolution. For example: a 256×320 array which images a 100 degrees of angle horizontal FOV can yield an accuracy of $100/320 \cong 1/3$ degree of angle. This angular accuracy can be sufficient for identifying the specific shooter, as it presents approximately 2 m error in a light-arms effective range of 300 m. Further by way of example, the high-resolution camera can be characterized by an inter-exposure interval that is shorter that a pulse duration of an event of interest. The camera can operate in a wavelength of high sensitivity to the flash, but can also work in a spectrum range that is less optimal than the spectrum used for the photodetectors. According to examples of the presently disclosed subject matter, the camera can include any one or any combination of the following: Lattice Matched SWIR ($In_{0.53}Ga_{0.47}As$), Extended SWIR detectors (strained InGaAs, MCT, PbS Superlattice, etc), or un-cooled bolometric cameras or MWIR detectors such as cooled InSb or cooled MCT and others. The frame rate of an infrared (SWIR or MWIR) camera with over 10,000 pixels is typically limited to 100 s of FPS (Frames Per Second). Particularly fast cameras may be as fast as 2000 FPS full frame, which results in integration time of 0.5 msec. Even at this high frame rate, the frame time is longer than the small caliber light arms muzzle-flash. Since the photodiode samples the flash multiple times, it already provides the time-dependent signature of the event. Therefore, there is no necessity for the imager to provide several images within the flash duration.

According to examples of the presently disclosed subject matter, imaging unit is capable of operating with an inter-exposure interval that is shorter than a pulse duration of an event of interest. The inter-exposure interval of the imaging unit 20 is such that it is short enough so that the pulse does not occur within the inter-exposure interval (and could be missed by the imaging unit 20).

Furthermore, according to examples of the presently disclosed subject matter, the imaging unit is capable of operating at a frame rate which yields a frame time (which is equal to the sum of the exposure time and the inter-exposure interval) that is approximately equal (e.g., as close as possible) to the (estimated) duration of a shortest event of interest. The closer the integration time of the imager to the shortest flash duration, the lower the clutter that will be collected (because a smaller portion of the radiation is collected while the signal from the flash is not present), and the signal to clutter ratio will improve. This improvement will stop at the point when the imager frame time will be about half the shortest flash duration. In this case, at least in one frame, the integration time will be contained within the flash duration, achieving a better signal to clutter ratio relative to the case of a longer frame time. Since increasing the frame time is technically difficult and costly, it makes sense to increase it only up to the point where the signal to clutter peaks at the imager or meets a certain threshold (if less than the optimal result is acceptable), and collect the time-dependent signature using the low resolution photodetectors.

According to examples of the presently disclosed subject matter, the imaging unit includes, a non-cryogenically cooled infrared detectors array, including for example any one of: CMOS, CCD NIR or lattice-matched InGaAs, Extended-SWIR InGaAs, Extended-SWIR MCT, PbS, PbSe or bolometric detectors. Bolometric detectors are intrinsically limited to long integration times of several milliseconds. Therefore, they are not suitable for gunfire detection applications, but remain relevant for longer flashes such as in the case of antitank missile launch and mortar fire, which in some examples of the presently disclosed subject can be the types of optical events which are of interest. Cryogenically cooled array detectors can be difficult to operate at high frame rates, such as those required from the imaging unit according to examples of the presently disclosed subject matter. At least in part, this is due to the heat generated by the array detectors and excess heat conductivity generated by the extra communication lines. The heat buildup and the need to provide a large cooling capacity by the cryogenic cooler to deal with it, increases its cost and size, if this is at all possible. Suitable detectors for gunfire detection which also present a good cost-performance ratio are lattice-matched SWIR detectors, and mostly such that are configured to utilize the atmospheric absorption bands (see for example US Patent Application Publication No. 2011/0170798 to Tidhar). Extended SWIR detectors may also be useful as such sensors provide good signal to clutter ratio while maintaining intermediate cooling requirements compared to the cooled infrared detectors in the MWIR band. NIR imagers are the most commercially available, have lowest cost, highest frame-rate and highest resolution. With careful choice of sub-bands in the NIR, NIR imagers present a cost effective choice of imagers, mainly for larger caliber applications where the signal is significant also in the NIR. A challenge in a NIR detection system is avoiding false alarms—but in some settings, the false alarms can be eliminated to some extent by the photodetectors, enabling an effective use of NIR imagers for primarily locating, rather than detecting and discriminating optical events of interest, as done in prior art systems.

According to examples of the presently disclosed subject matter, the imaging unit 20 can be configured to capture images (or frames) independently of the operation of the photodetector 10 and the samples generated by the photodetector 10. Still further by way of example the imaging unit 20 can be configured to capture images (or frames) continuously. The images can be captured one after the other with only an inter-exposure interval in between pairs of consecutive images. The images can be captured as long as the system 100 is in active mode. The images can be kept in the frame buffer 30, and the buffer can store the images and overwrite older images, as necessary, according to a predefined images buffering scheme.

According to examples of the presently disclosed subject matter, the frame buffer 30 can be capable of temporarily storing a certain number of images that were captured by the imaging unit 20, or the frame buffer 30 can have a certain capacity which corresponds to some number of images that can be stored thereon. According to further examples of the presently disclosed subject matter, the capacity of the frame buffer 30 can be sufficiently large so as to allow for the storage of at least one image that completely precedes an event of interest, at least one image that was captured during the event of interest and at least one image that was captured after the flash from the event of interest has decayed. In further examples of the presently disclosed subject matter, the buffer 30 can be large enough to store all images taken within a duration that extends between the beginning of the longest event of interest to the time it takes to determine based on the photodetector that a suspected flash event has occurred. For example, assuming a 50 msec flash, and 30 msec for the photodetector and its respective processing to decide that a suspected flash event has occurred, if the frame time of the camera is 1 msec, then at least 80 frames can be stored. If the detection process is configured to use frames which predate a detected suspected flash event, the buffer 30 capacity can be extended further to enable storage of a certain (e.g., predefined) frame which precedes the instant of the detected suspected flash event.

According to examples of the presently disclosed subject matter, the system 100 can be configured to detect a plurality of suspected flash events simultaneously within the same imager, and to determine which, if any, of the plurality of detected suspected flash events is/are an event of interest. According to examples of the presently disclosed subject matter, the frame buffer 30 can have a capacity which supports multiple suspected flash event detection and validation. The exact size of the frame buffer 30 can be a design choice.

According to examples of the presently disclosed subject matter, as will be further described below, motion analysis algorithms can be implemented by the processor 40 as part of the process of determining whether a detected suspected flash event is an event of interest. Various motion analysis algorithms are known in the art and can be implemented herein, including optical flow, and motion analysis algorithms that are used in standard video compression algorithms such as MPEG, H.264, and others. It would be appreciated, that in order to create a reliable motion vector, the ability according to examples of the presently disclosed subject matter to use images that were taken before the start of the suspected flash event, can contribute to the reliability and usability of the motion analysis.

According to examples of the presently disclosed subject matter, in case motion analysis algorithms are used as part of determining whether a suspected flash event is an event of interest or not, the frame buffer 30 can have a size that is sufficient to store the number of frames that is required for motion analysis. This number can be determined according to some predefined motion model or models. Motion analysis can be used to accurately subtract the background from the images which include the flash, according to the motion at the location of the flash event in the frame, and, in some cases, avoiding the need for a navigation system for determining the motion. It can also be used to attribute long-lasting flashes from different pixels to the same event according to the local motion at the specific area.

By way of example, the frame buffer 30 can be configured to support detection of hundreds of suspected flash events, or typically 1 second=1000 frames, assuming 320×256 pixels×2 Bytes/pixels×1000 events=164 MByte. As long as the photodetector can distinguish the optical events within its field of view, the optical events can also be distinguished in the imager. This is unlike systems that use the photodetector as a trigger for the imager.

According to examples of the presently disclosed subject matter, the frame buffer 30 includes computer readable memory, such as NVRAM, RAM, ROM, EEPROM, flash memory or other suitable data retention, memory or storage technology.

According to examples of the presently disclosed subject matter, the processor 40 can be configured to control the detection system 100. The processor 40 can also control or assist in controlling any component of the system 100 or certain operations which are implemented in a component of the system. Still further by way of example, the processor 40 can include a processor, a microprocessor, a microcontroller, a field programmable arrays (FPGA), application-specific integrated circuit (ASIC), etc.

By way of example, in addition to the frame buffer 30, the detection system 100 can include memory 50. Still further by way of example, the memory 50 can be configured to store digital data, programs, executables, code, statistics, parameters, libraries (e.g., temporal and/or spectral signature libraries, libraries of trajectories, libraries of spatial signatures mostly—for cases of launch from a close range), characteristics and/or other relevant information which is necessary for or used in the operation of the detection system 100 or any of its components. One or more of the components of the detection system 100 can access the memory 50 in utilizing the programs, data, libraries, and/or other information, and/or for storing data. The memory 50 can include volatile and nonvolatile, removable and non-removable media implemented in substantially any relevant method or technology for data retention such as computer readable instructions, data structures, program modules or other data. For example, the memory can include, but is not limited to, NVRAM, RAM, ROM, EEPROM, flash memory or other memory technology, CD-ROM, digital video disk (DVD) or other optical disk storage, magnetic cassettes, magnetic disk storage or other magnetic storage devices, or any other tangible medium which can be used to store the desired information and which can be accessed by the components of the detection system 100. In addition or alternatively, the memory 50 can be included in one or more of the other components of the detection system 100.

The detection system 10 and/or a component of the detection system 10 can be implemented in hardware or a combination of hardware and software.

Figure 3:
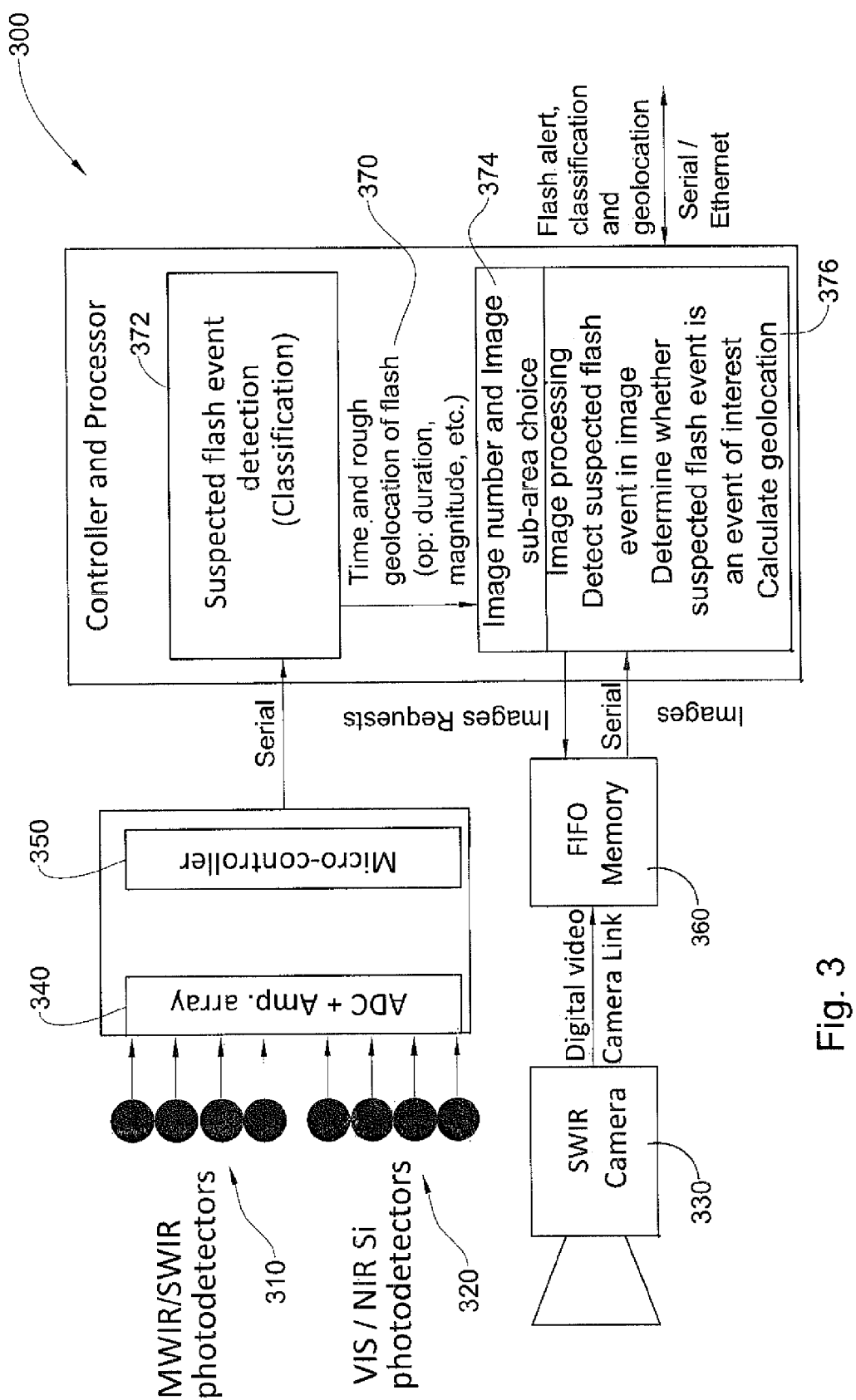
FIG. 3 is a functional block diagram illustration of one possible implementation of the detection system in FIG. 1, according to examples of the presently disclosed subject matter.

Reference is now made to FIG. 3, which is a block diagram illustration of one possible implementation of the detection system in FIG. 1, according to examples of the presently disclosed subject matter. By way of example, the detector system 300 includes two arrays of photodetectors: a MWIR or SWIR photodetectors array 310 and a VIS or NIR photodetectors array 320. The detector system 300 can include for example, a SWIR camera 330, which is capable of producing hi-speed and high-resolution images, for example, the SWIR camera 330 shoots a digital video stream. The SWIR provides geolocation and validation for of all calibers without the need for cryogenically cooling. Alternatives to SWIR camera include for example: NIR which low cost; bolometric which provides night-vision capability; MWIR which is cryogenically cooled. The camera 330 is functionally independent from the operation of the photodetector arrays 310 and 320.

Further by way of example, photodetector arrays 310 and 320 are operatively connected to an analog to digital convertor and an amplifier 340 array, which generate an amplified and digitized signal from the photodetector samples. A microcontroller 350 streams the digital samples from the photodetectors together with timestamps for each sample and possibly also spatial reference indicators (to indicate FOV is covered by each sample). The microcontroller 350 can also be configured to control the currents, power and calibration of the photodetectors, and can be configured to communicate with the central controller and processor of the system. The microcontroller 350 can also be configured to provide time-synchronization with and between the other components of the system (all or some of which). In some configurations, the microcontroller 350 can be configured to perform the initial detection function, which in FIG. 3 appears in block 370.

Still further by way of example, the images from the SWIR (or NIR) camera 330 are fed to a FIFO buffer 360, e.g., over a digital video camera link. Each frame from the SWIR (or NIR) camera 330 includes a timestamp that indicates the time at which the frame was captured. Possibly, with each frame there is also provided a spatial reference indicator which indicates which FOV is covered by the image. The timestamp and spatial reference indicator can be stored in the FIFO memory 360, possibly in a way that facilitates quick access to images in the buffer according to a given timestamp and/or according to a given spatial reference indication. For example, tables indexes and other suitable data structures can be used for indexing and accessing the frames in the FIFO memory 360. Since the spatial reference does not change frequently, it can be calibrated and stored in a different location, and be re-calibrated and re-entered to the system only when a photodetector or a camera is replaced or in any other predefined event.

According to examples of the presently disclosed subject matter, a processor 370 receives (either by push or pull) the photodetector samples stream and processes the samples, e.g., using a predefined suspected flash event criterion (time dependent intensity, time-dependent spectral ratio etc.), to determine whether the photodetector samples at a certain period of time, and possibly also at a certain bearing (relative to a given reference point) are indicative of a suspected flash event. For illustration purposes, the suspected flash event detection process which is implemented by the processor 370 is depicted by block 372.

According to examples of the presently disclosed subject matter, in case the processor 370 determines that the photodetector samples indicate a suspected flash event, the processor 370 determines a time and an initial spatial reference of the suspected flash event according to the FOV covered by the photodetector. According to some examples of the presently disclosed subject matter, the processor can determine a duration of the suspected flash event, the time when it started (e.g., using a time reference or index, or a clock count), classification of the source of the flash (which type of weapon was launched), a magnitude of the flash event (which, with the knowledge of the weapon type can enable rough estimation of the range), level of certainty, and other parameters.

According to examples of the presently disclosed subject matter, following a detection of a suspected flash event and extraction of a time and possibly also a initial spatial reference of the suspected flash event, the processor determines an image number and possibly a relevant scene sub-area according to the time, duration and geolocation data from the photodetector samples which were identified to be indicative of a suspected flash event. For illustration purposes, the photodetector samples to images cross referencing process is depicted by block 374.

According to examples of the presently disclosed subject matter, the processor 370 then retrieves from the FIFO buffer 360 the image which matches the image number of the sub-area. This process can be repeated for several images, or the processor can simply retrieve a plurality of images which correspond to the suspected flash event. The selection of which images to retrieve from the FIFO buffer 360 can be based on various algorithms and logic which can be implemented by the processor 370.

Some examples of selection criteria which can be used by the processor 370 include: take a certain number of images from the buffer, where at least one image is an image that was captured before the start of the suspected flash event; take as many images that were taken during the occurrence of the suspected flash event as possible plus a certain number of images before the start of the event, and possibly also, a certain number of images that were taken after the event ended.

Further by way of example, the processor 370 can select the images that are to be retrieved from the FIFO buffer 360 according to the spatial information that is provided with (or is otherwise associated with) the photodetector samples and/or according to the spatial information that is provided with (or is otherwise associated with) the buffered images.

According to examples of the presently disclosed subject matter, the processor 370 can be configured to calculate a geolocation of the event of interest based on the processing of the retrieved images, by locating the pixel which best matches the suspected flash that was detected by the photodetectors. For example: the photodetectors indicate that there is a suspected flash at a given time, with a given duration at a given sub-area of the images from one of the cameras. The images, which were retrieved according to the data from the photodetectors are supposed to include the optical signature of the suspected flash event, are processed with images, which according to the data from the photodetectors, are not supposed to include the optical signature of the suspected flash event (the latter group of images serves chiefly as a basis for subtracting the background from the images which include the optical signature of the suspected flash event). In the difference image or images (in case of a flash that is longer than a single frame time), a processing stage can be implemented for locating a pixel (or a group of adjacent pixels, typically 1-4 pixels) which best matches the signature of the suspected flash event as measured by the photodetector(s). In this context, a best match can relate to: a pixel reading value (indicating a highest energy reading with respect to other pixels and/or with respect to readings from the photodetector), a duration of the suspected flash event, a size of the suspected flash event signature (for example, if the signature is represented by more than a predefined number of pixels, or it has a non-compliant spatial shape, or its in-pixel time-dependent signature does not match the signature as read by the photodetector, the suspected flash event can be disqualified, or another pixel having a better match may be selected as the pixel where the flash event of interest occurred).

As mentioned above, according to some examples of the presently disclosed subject matter, the validation phase can include both a validation function and a geolocation function. The pixel that was selected as part of the validation function, as mentioned above, can serve the geolocation function. Each pixel in the image (or images) captures radiation from a different direction/bearing with respect to the imager's orientation (also known as a mechanical reference of the system). Thus, once it is determined which pixel captured the radiation from the event of interest, the bearing to the event of interest is determined. Inertial measurement unit ("IMU") and/or GPS can be used to provide a global azimuth and elevation with respect to the geographic location (rather than the system mechanical reference) to the event of interest.

According to some examples, in case more than one pixel (a group of adjacent pixels) is selected during the validation function, then the bearing to the event of interest can be calculated as a weighted average or any other kind of average of the bearing of the pixels that were selected.

Further by way of example: in case the images were taken from a moving vehicle, the areas in the image that are closer to the vehicle move at a higher pixels/frame rate than those from further areas. A motion analysis algorithm can be used to segment the images to small blocks, and assign a motion vector to each block based on cross correlation or similar algorithms. The images without the suspected flash can be subtracted from the images with the flash using a block-by-block motion correction, and the relevant background in each area within the image may also be subtracted. This process can significantly improve the signal to clutter ratio in the imager, improving the probability to locate within the images the suspected flash that was detected by the photodetector. After properly subtracting the background from the images which include the optical event that is considered to be the suspected flash event, the area in the image (e.g., a pixel or a group of neighboring pixels) which best matched the suspected flash event detected by the photodetector can be processed to determine whether the suspected flash event is an event of interest (or not). The specific pixel (or neighboring pixels) in the image where this suspected flash event was found is directly related to the geolocation of the event. According to examples of the presently disclosed subject matter, the angular geolocation of the event of interest can be determined. It would be appreciated that in some examples of the presently disclosed subject matter, the geolocation of the optical event (which can be an event of interest) can be determined directly from the images, and without using or relying on an inertial measurement unit ("IMU") or a similar device for subtracting the background from the image. Moreover, the ability to use motion vectors, based on the images from before the suspected event, and based on the independent high-frame-rate image capture, can enhance the signal to clutter ratio at the imager, enabling the use of lower cost imagers using wavelength bands which are commonly considered to be inferior to MWIR bands for this application (such as using InGaAs detectors in the SWIR or CMOS detectors in the NIR or bolometric detectors instead of cooled InSb detectors in MWIR).

In further examples, the processor 370 can process the images that were retrieved from the FIFO buffer to determine whether the suspected flash event is an event of interest or not. According to examples of the presently disclosed subject matter, the processor 370 can be configured to carry out various motion processing operations to detect and analyze the optical event in the images (or the lack thereof), and the processor can apply various events of interest criteria to determine, based on the processed images, whether the suspected flash event is an event of interest or not. For example: one of the problems of detection systems is detection of false flashes which are caused by glints (e.g., sun glints) from moving objects, such as cars or birds. A tracking algorithm may be used to track moving objects appearing in a sequence of images, and advantageously the sequence of images would include images taken before and after the occurrence of the flash event. Such a tracking algorithm, supported by a plurality of images which include the moving object, can be used to disqualify suspected flashes which are not of interest.

Another example of a manner by which the processor 370 can use the availability of the images and their use to validate a suspected flash event (as an event of interest) is the following: in case, as in some examples of the presently disclosed subject matter, the imagers work in a spectral band that is different from the spectral bands of the photodetectors, the images can provide additional spectral information that can be used (by the processor) to confirm or reject the original spectral analysis based on the spectral bands of the photodetectors.

In yet another example of an attribute of the images and its use in the flash detection process: in most cases of interest, the flash captures an angle smaller than the IFOV. Therefore, its radiation should be captured by 1, 2, or 4 pixels, depending on its location with respect to the edges between the pixels, and depending on the Point Spread Function (PSF) of the optical system. In case the flash radiation is detected by more than four pixels, it may indicate an event which is too large for a flash (and may result from another source of radiation) or it may indicate a very close flash. These cases cannot be resolved based on the data from the photodetectors alone, because the photodetectors lack the spatial resolution that the imagers have. Accordingly, in some examples of the presently disclosed subject matter, during the validation phase, the images can be processed to validate or disqualify suspected flash event indications.

Yet another example of the use of data from the images to validate a suspected flash detection and possibly to determine a geolocation of an event of interest (or to improve the process of determining the geolocation of the event of interest): in case an event of interest is longer than the frame time of the imager, several images may include radiation readings from the optical event. In such a case, a time-dependent signature may be generated from the images which include the radiation readings. As part of the validation phase (which possibly includes also a geolocation process), the time-dependent signature can be compared with the signature captured by the photodetectors, in order to validate the detection or to better choose the pixels in which the flash was captured.

For illustration purposes, the process of validating a suspected flash event as an event of interest (or determining that it is a not of interest event) which is implemented by the processor 370 is depicted by block 376.

According to examples of the presently disclosed subject matter, the system 300 can be configured to communicate, externally, information with regard to the optical event, in particular, with regard to an optical event which was determined to be an event of interest. To this end the system can include a transmitter or a transceiver (neither are shown in FIG. 3) and any necessary interfaces, antenna or any other device or component. The information with regard to the optical event can include: an alert in case the event was determined to be an event of interest, geolocation of the event, classification of the type of source which caused the optical event, timestamp, estimated range, certainly level, etc. In some examples of the presently disclosed subject matter, the system 300 can also be configured to receive data, including for example configuration data, including data which configured the suspected flash event criterion and/or the event of interest criterion, information about the range map of the field of view, indication from an external source about a suspicious event (e.g. a radar) etc.

Figure 4:
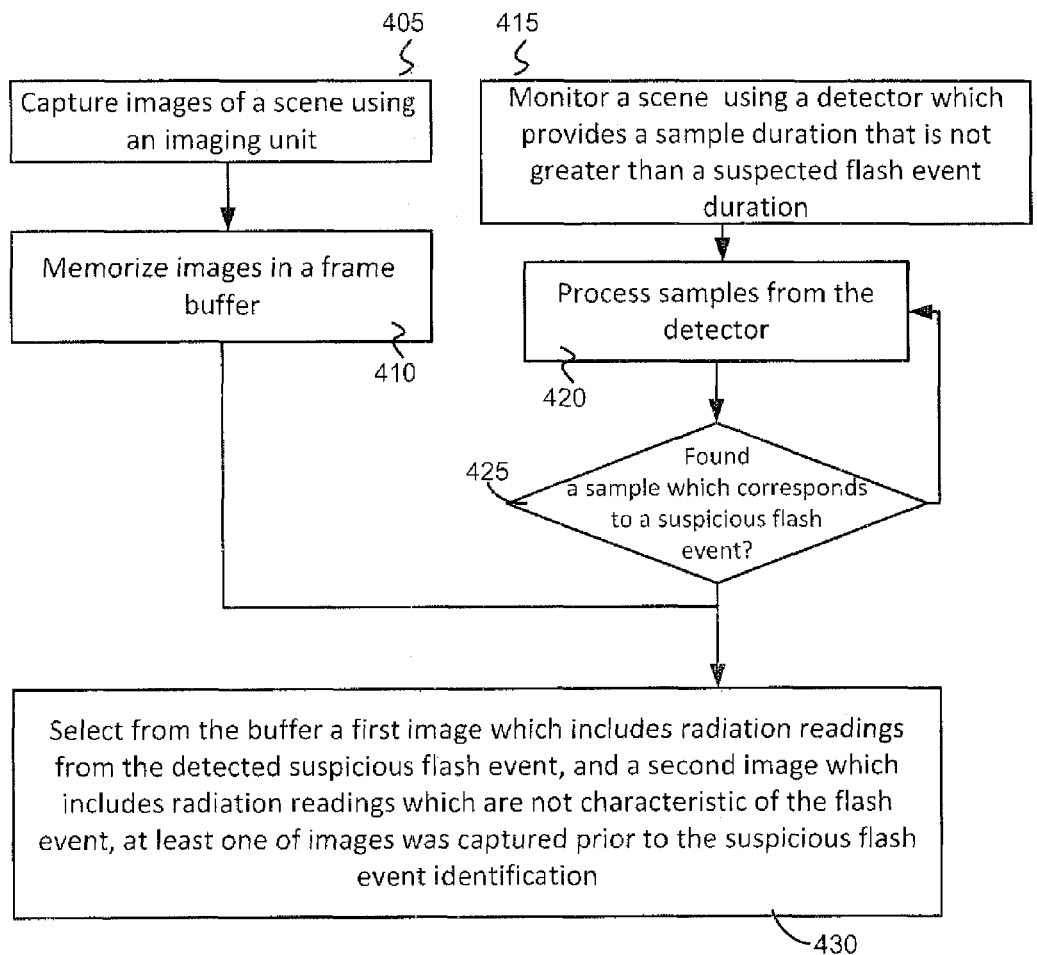
FIG. 4 is a flowchart illustration of a detection method, according to examples of the presently disclosed subject matter.

Additional reference is now made to FIG. 4, which is a flowchart illustration of a detection method, according to examples of the presently disclosed subject matter. In the following description of detection method illustrated in FIG. 4, reference is made to the detection system 100 and its various components which are shown in FIG. 1, and which were described above with reference to FIG. 1. It should be appreciated however, that the detection method according to examples of the presently disclosed subject matter, is not necessarily limited to being applied to detection system 100, and other detection system designs and configurations can be used in conjunction with the detection method according to examples of the presently disclosed subject matter.

According to examples of the presently disclosed subject matter, as a matter of routine, images of a scene can be captured using an imaging unit (block 405). The images captured by the imaging unit can be memorized in a frame buffer (block 410). The capturing and memorizing blocks can be implemented continuously, e.g. the imaging unit can operate in a video or video-like mode.

According to examples of the presently disclosed subject matter, independently of the operations described in block 405 and 410, a scene can be monitored using a photodetector which provides a sample duration that is not greater than a suspected flash event duration (block 415). In a specific example, the sample duration is a fraction (e.g., a predefined fraction) of the shortest flash event duration of interest, so that, for example, five or more samples of the scene can be obtained during an event of interest (which would be recognized initially as a suspected flash event). By way of example: if the flash event of interest is light-arms muzzle-flash, whose duration is 0.5-1 msec, then the sample duration of choice may be around 0.05-0.2 millisecond. The scene which is monitored by the high sampling rate photodetectors can overlap with the scene that is imaged by the imaging units, although these two scenes may not necessarily be fully overlapping. Typically, several photodetectors cover the field of view of each imaging unit. A mapping among each photodetector and corresponding regions in the FOV of each imager can be kept by the system, and can be used during validation phase.

The samples from the photodetector 10 can be processed (block 420). For example, a sample can be compared to a predefined suspected flash event criterion. Further by way of example, a prestored signature bank can be stored in the memory unit 50, and the processor 40 can compute a cross-correlation between the time-dependent signatures from the signature bank and the signal (radiation emission vs. time readings) from the photodetector 10. In yet further examples, the processor can use wavelets analysis, heuristic analysis or any other processing of the signals to determine if the signals correspond to a suspected flash event signature. By way of further example, the processor can compute the spectral ratio vs. time of the readings from photodetectors of different wavelength bands with overlapping field of views, and determine whether this time-dependent or total spectral ratio corresponds to a suspected flash event. The suspected flash event detection phase can include pre-processing functions, such as background subtraction (for example, by using AC coupling, bias subtraction and other methods).

According to examples of the presently disclosed subject matter, in case it is found that a certain sample includes radiation emission readings which are indicative, e.g., according to the suspected flash event criterion, to a suspected flash event (block 425), images from the frame buffer 30 can be selected to determine whether the suspected flash event is an event of interest or not.

According to some examples of the presently disclosed subject matter, if a sample which includes radiation emission readings which are indicative of a suspected flash event is identified, a first image which includes radiation readings from the detected suspicious flash event and a second image which includes radiation readings which are not characteristic of the flash event can be obtained from the buffer 30, where at least one of first and the second images was captured prior to the suspected flash event identification (block 430).

According to examples of the presently disclosed subject matter, at least one of the images retrieved from the buffer includes a signature of the suspected flash event, and at least one other image from the images retrieved from the buffer does not have the signature of the suspected flash event in it (e.g., it was taken before or after the suspected flash event). Further by way of example, the image which does not have the signature of the suspected flash event can be an image which precedes or supersedes the flash event.

According to examples of the presently disclosed subject matter, the timing of the samples from the photodetectors and the timing of the images captured by the imaging system may be cross-correlated. For example, a system clock can be used to time-index the samples and the images. Based on the processing of the samples from the photodetectors, time-indexes can be determined for the retrieval of images from the buffer.

According to further examples of the presently disclosed subject matter, in case the FOV of the photodetector is smaller than the FOV of the imaging unit 20, only the portions of the images that overlap the FOV of the photodetector 10 which indicated a suspected flash event will be selected. This can occur, for example, when an array of photodetectors is used for detecting a suspected flash event, and when the suspected flash event is detected by one (or by some) of the photodetectors in the array. In such a case, a predefined spatial referencing can be predefined in the system to allow the system to determine which portion of an image or of images correspond to the FOV of a given photodetector from the array of photodetectors.

The images that were retrieved from the buffer can be processed to determine whether the signature (or signatures) of the suspected flash event meets a predefined event of interest signature criterion. Further by way of example, a prestored signature bank can be stored in the memory unit 50 possibly together with additional criteria, and the processor 40 can compute a cross-correlation between the signatures from the signature bank and the images that were retrieved from the buffer. Examples of the image processing operations which can be included in the validation phase were described above.

The processor 40 can perform any other suitable computations and processing operations with respect to the images that were retrieved from the buffer and using any other suitable criteria to determine whether the suspected flash event is an event of interest or not. According to examples of the presently disclosed subject matter, the processor can be configured to process the images that were retrieved from the buffer and to implement motion analysis algorithms such as optical flow to assess the relative motion between the system and the local area which includes the suspected flash, to enable precise background subtraction. In addition, the algorithm can identify moving objects in the area of interest, which are capable of generating false flashes. Such false flashes may be classified as suspected flash events, which are subsequently, following the validation phase, disqualified as not-of-interest events.

Figure 5A:
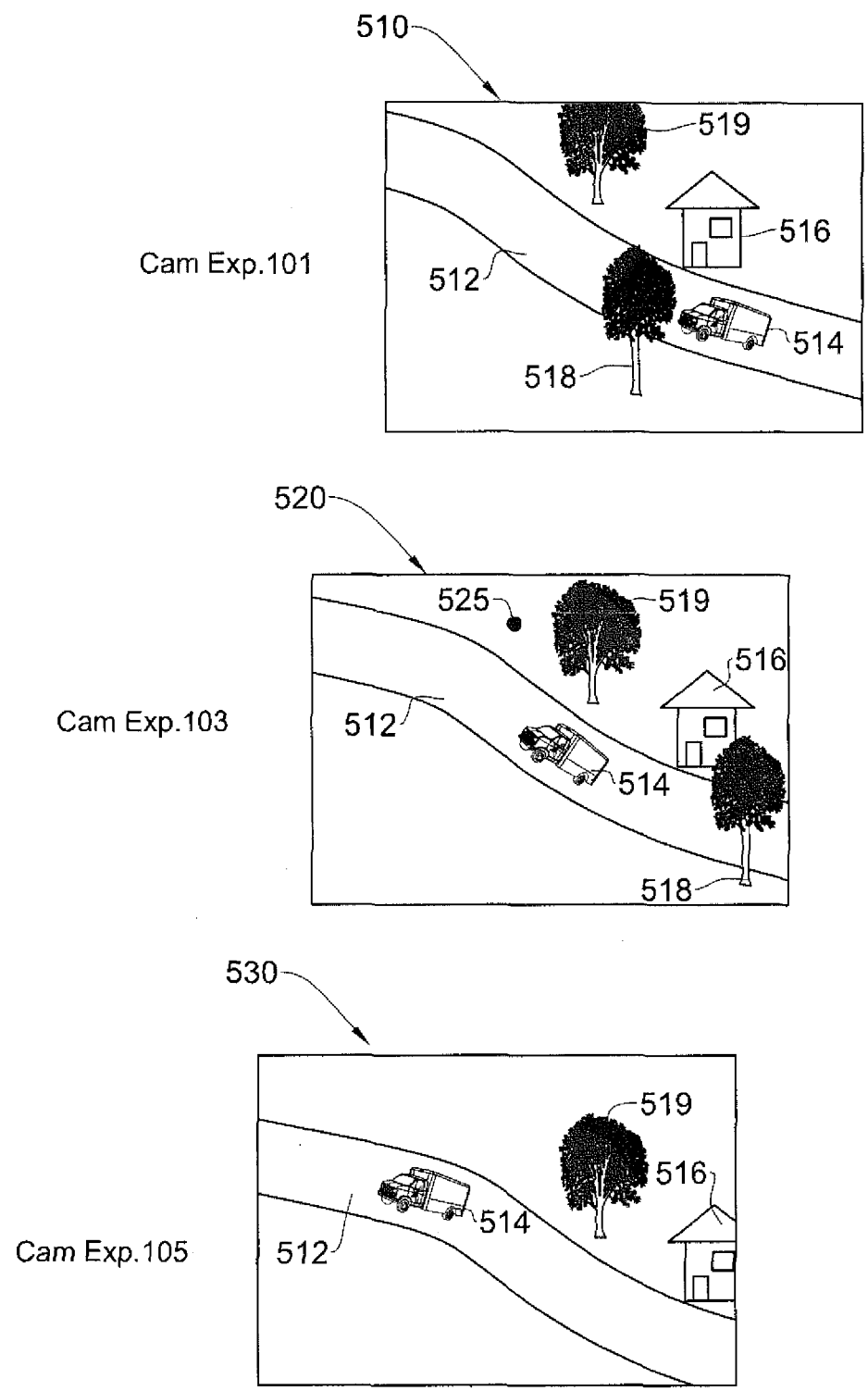
FIG. 5A illustrates a graphical illustration of images of a scene retrieved in response to a detection of a suspected flash event, according to examples of the presently disclosed subject matter.

For example, referring now to FIG. 5A, there is shown a graphical illustration of images of a scene retrieved in response to detection of a suspected flash event. As can be seen in FIG. 5A, image 510 (camera exposure 101) shows a road 512, a truck 514 on the road and a house 516 and trees 518 and 519, where tree 518 is closer to the system than tree 519. Image 520 (camera exposure 103) shows the same road 512, truck 514, house 516 and trees 518 and 519 from image 510, possibly the relative location and/or the relative size of at least some of which has changed, e.g., due to movement, and also possibly the location within the frame of some of the objects also shifted, e.g., due to panning or motion of the system.

Also apparent in image 520 is a flash 525 from a gunshot. For the sake of illustration, it is assumed that some time after the flash 525 occurred, the flash 525 is identified to be a suspected flash event, and subsequently an event of interest. In image 530 (camera exposure 105) the same road 512, truck 514, house 516 and tree 519 from images 510 and 520 are shown, but in this image the closer tree (518) has drifted outside the frame.

Such possible perspective and relative size changes, for example, due to different angular motion of objects in the scene, should be coped with in an efficient manner. For example, when the system is in motion, the relative size and/or the relative location of different objects in the scene can change between frames as a result of different ranges between the system and the various objects in the scene. In another example, the relative size and/or the relative location of different objects in the scene can change between frames as a result of motion of objects in the scene.

Thus for example, in FIG. 5A, subtracting the truck requires identification of the truck in each of the images and implementing a motion vector calculation. It should be noted that global motion estimation and compensation may not be sufficient and may result in false detection as a result of motion in the images.

Figure 5B:
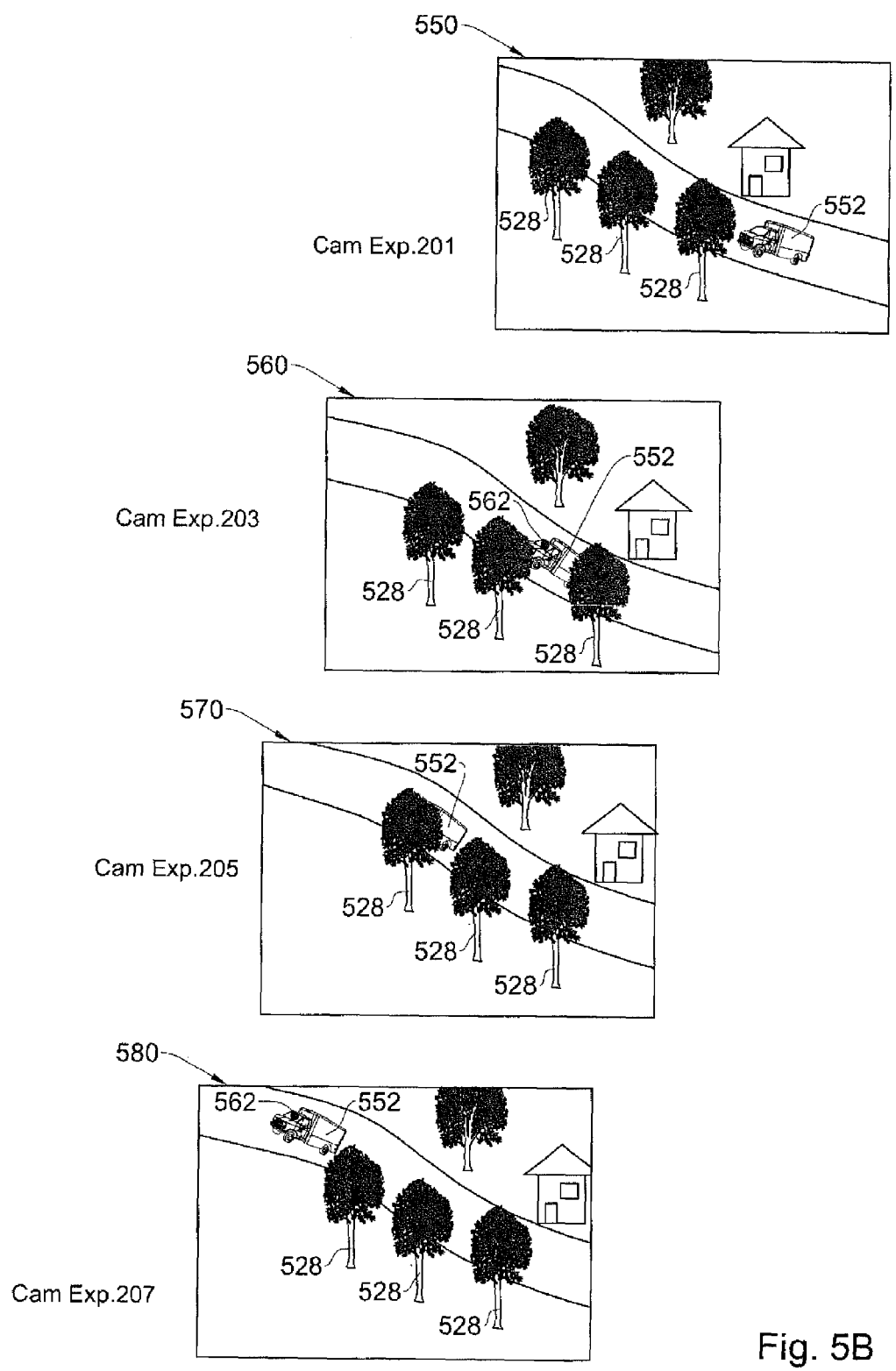
FIG. 5B illustrates a graphical illustration of images of a scene retrieved in response to a detection of a suspected flash event, according to examples of the presently disclosed subject matter.

Reference is now made to FIG. 5B, where there is shown a graphical illustration of images of a scene retrieved in response to detection of a suspected flash event. As can be seen in FIG. 5B, in image 550 and in image 560 the truck 552 reflects the sun and a glint is picked up by the photo-detectors. The truck 552 travels behind the trees 528, which may cause the sun-glint 562 to modulate so that it is captured by the photodetectors as if it were a flash (the detector identifies the modulated glint from the truck as a suspected flash event). It would be appreciated that detection of certain types of glints as a suspected flash event can be prevented at least to a certain extent by implementing a complex criteria for discerning a suspected flash event as mentioned above, for example, spectral domain and time domain processing can be used to eliminate false positives to some extent. False positive detection of suspected flash events can be further reduced by implementing temporal spatial processing, such as object motion tracking. For example, in FIG. 5B a sequence of images 550-580 are processed, and multiple appearances of an optical event, are identified. In this particular example, sun glint 562 is determined to be a suspected flash event. Following the suspected flash event detection phase, in which sun glint 562 is determined to be a suspected flash event, an event of interest validation phase is implemented, and in this phase a motion tracking algorithm is applied to the multiple images 550-580. The motion tracking algorithm attributes the sun glint 562 reflected from the truck 5.52 and modulated by the intervening grove of trees 528, to motion of a single object intermittently obstructed by a chopper, and therefore using the event of interest criteria, the system concludes that the sun glint 562 is not a suspected flash event.

If at block 425 it is determined that the sample is not a suspected flash event sample, the selection operation in block 430 is not invoked. It would be appreciated that according to examples of the presently disclosed subject matter, the detection (block 415), sample processing (block 420) and evaluation of the samples to determine whether they are indicative of a suspected flash event or not (block 425), as well as the image capture (block 405) and memo-rizing (block 410) operations can resume uninterruptedly regardless of the results of the operations in block 425.

According to examples of the presently disclosed subject matter, processing of suspected flash events and detection of events of interest include the various blocks and operations shown in FIG. 4 and described herein, which can be invoked with respect to a plurality of optical events, in parallel (concurrent events), or in series, and/or whether such events are eventually deteiinined to be event of interest or not. Still further by way of example, the limiting factors with respect to the various blocks and operations shown in FIG. 4 and described herein are related to the performance capabilities of the various components of the system which are used to implement and carry out the operations. For example, processing of the samples and/or of the images by the processor, reading of images from the frame buffer, etc.

Figure 6:
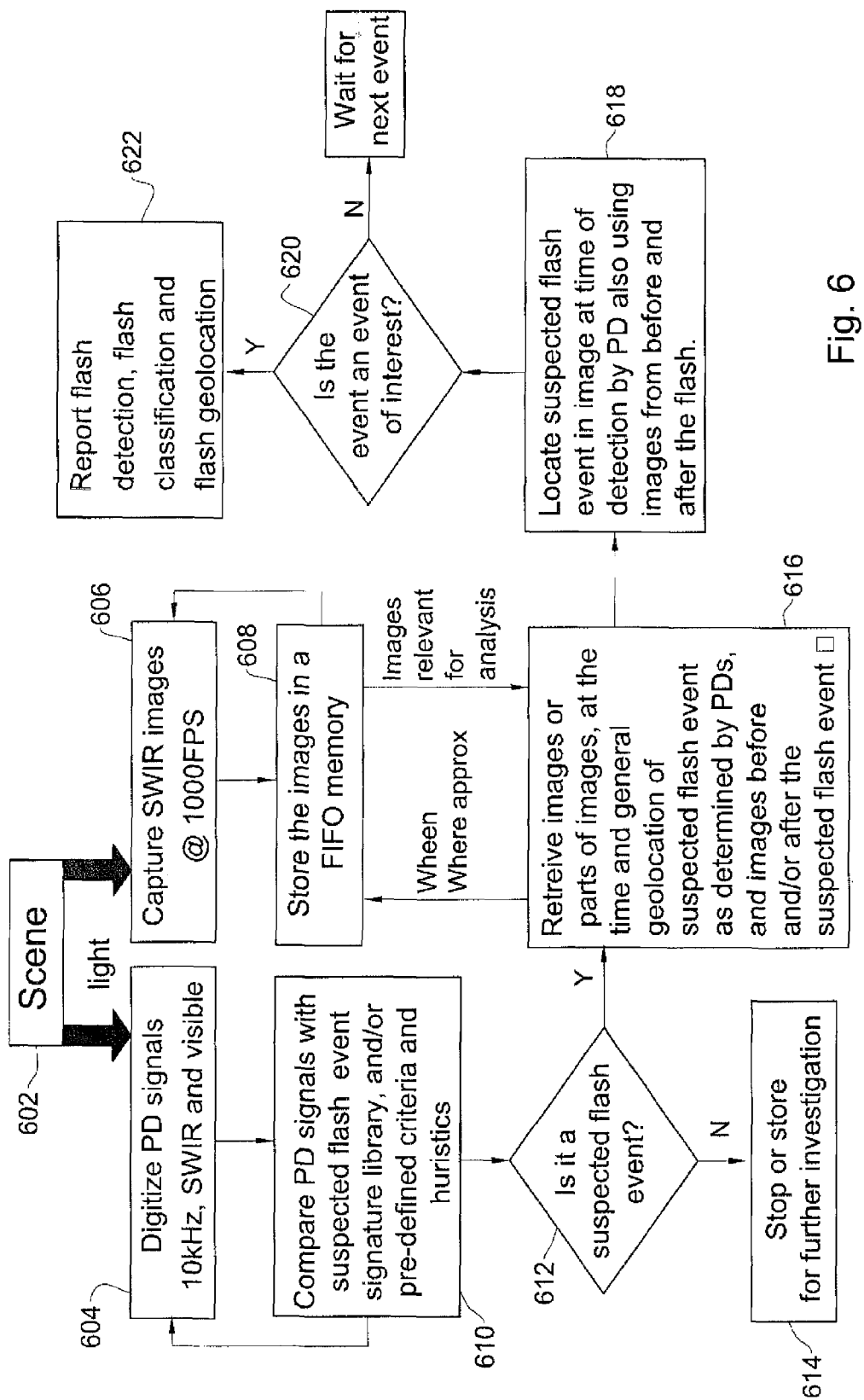
FIG. 6 is a flowchart illustration of the method according to FIG. 4 in one possible implementation according to examples of the presently disclosed subject matter.

Reference is now made to FIG. 6, which is a flowchart illustration of the method according to FIG. 4 in one possible implementation according to examples of the presently disclosed subject matter. Block 602 represents the scene and the light (radiation) emitted, reflected, scattered etc., from the scene. In block 604 the radiation in the SWIR and visible bands is detected by a photodetector and sampled at approximately 10 kHz (or at a slower rate if only flashes longer than 1 ms are of interest). In parallel, an imaging unit, which operates independently from the photodetectors, captures SWIR images at 1000 FPS (or at a slower rate if only flashes longer than 1 ms are of interest) (block 606). By way of example, the images are stored in a FIFO memory (block 608).

At block 610 the samples from the photodetectors are processed using the suspected flash event criterion, e.g., a prestored flash events library, other predefined criteria and/or heuristics. The comparison can be carried out continuously, e.g., for each new sample. It should be noted that the process in block 610 can involve previous samples, and that one or more previous samples can also be recorded in a buffer for the purpose of carrying out the operation(s) in block 610. For example, to detect a signal rise which extends beyond a certain threshold, a few samples may be required. In another example, a few samples may be required to rule out a possible transient which is not a reliable signal.

At block 612 it is determined whether the samples from the photodetectors are indicative of a suspected flash event (this is the result of the processing in block 610). Another operation which can be implemented as part of the suspected flash event detection phase is to determine whether two flashes (or more) that were detected by two (or more) adjacent photodetectors at the same time relate to the same event or represent two separate events. If it is determined that the samples from the photodetectors are indicative of a suspected flash event; the system continues to operate: (samples are obtained and processed and images are captured and buffered) and no further action is necessary (block 614). As an option, one or more samples, and possibly images which coincide in time with the samples, and possibly also other images (e.g. before or after the given samples) can be stored, e.g., for further investigation.

In case, however, it is determined at block 612 that the samples from the photodetector are indicative of a suspected flash event, a time-index is determined based on the timing of the samples from the photodetectors, and images from the buffer are retrieved according to the time-index (block 616). As mentioned above, the samples from the photodetectors and the images from the imaging unit can be time correlated. The timing(s) of the samples which include radiation emission readings that correspond to a suspected flash event, which provide a temporal reference, is used for retrieving the images from the buffer. As mentioned above, at least one of the images that is obtained from the buffer can be an image of the scene before the start of the suspected flash event or after the optical appearance of the suspected flash event dissipated, or there can be at least one image which was captured before the start of the suspected flash event and at least one other image that was captured after the optical appearance of the suspected flash event dissipated (block 618).

Possibly in addition to the temporal relation among the photodetector samples and the imaging unit images, there may exist a spatial relation, when the photodetectors and/or the imaging unit have a multi-segmented FOV. This may be the case when multiple photodetectors are used and/or when the imaging unit includes two or more cameras. In such cases, the FOV of each photodetector and each camera is spatially referenced so as to allow cross-correlation. By way of example, the cross correlation can be used to select only images generated from a specific camera from the buffer for a given time-index based on a spatial index, or to search for an optical signature of a suspected flash event within a certain region of an image, etc.

According to examples of the presently disclosed subject matter, the images that were retrieved from the buffer can be processed to determine whether the suspected flash event is an event of interest or not (block 620). As mentioned, the images can be processed using a predefined event of interest signature criterion.

Using the retrieved image and the time-index provided, based on processing of the photodetector samples, the optical signature of the suspected flash event is detected in the images.

According to examples of the presently disclosed subject matter, in case an event of interest is detected, it can be communicated or otherwise reported (block 622). The communication or report can include various details about the event of interest such as its location, a classification of the event, etc.

Figure 7:
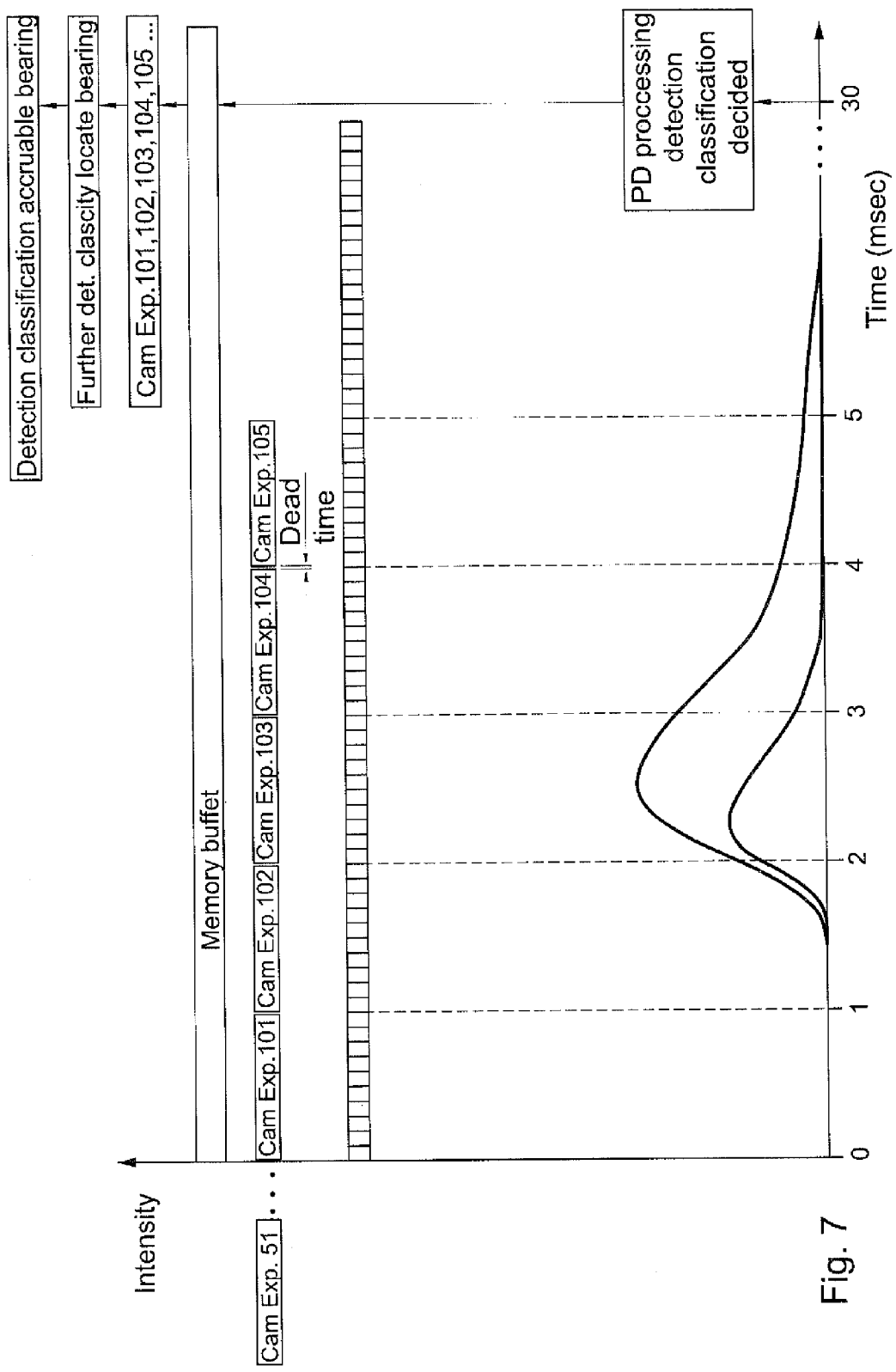
FIG. 7 is a graphical illustration of an operational time line for a detection method, according to examples of the presently disclosed subject matter.

Reference is now made to FIG. 7 which is a graphical illustration of an operational time line for a detection method, according to examples of the presently disclosed subject matter. The time line 700 shows a first band detection radiometry 702 and a second band detection radiometry 704 over time. The photodetectors and the imaging unit operate continuously and independently regardless of whether an optical event (e.g., a suspected flash event) is taking place or not. For example, as can be seen in FIG. 7, as indicated by the samples stream 710 and by the frames stream 720, during the period between t0 and t1 ten samples are obtained from the photodetectors, and a frame corresponding to camera exposure 101 is captured, and during this period there are no significant radiation emission readings from the scene.

As indicated by the memory buffer block 730, the frames from the frames stream 720 are stored in the buffer. By way of example, the buffer can hold tens and even hundreds of frames. The buffer can be configured to keep a certain number or up to a certain total capacity of frames, and can use various buffer management algorithms to determine which frame to discard to create space for incoming frames. For example, a FIFO buffer management scheme can be used. In another scheme, the buffer keeps a certain number of consecutive frames for a short time, but keeps sparsely distributed frames for longer flashes or for tracking objects over longer periods of time.

According to examples of the presently disclosed subject matter, at some point an optical event can occur. According to examples of the presently disclosed subject matter, samples from the photodetectors are fed to the processor. The samples which were taken when the optical event occurred can be identified as being associated with a suspected flash event using various processing methods. For example, U.S. Pat. No. 7,732,769 to Snider et al. discloses processing of samples of an optical event.

In U.S. Pat. No. 7,732,769 there is not a two-phase detection process as described in the present disclosure. The final determination with regard to the optical event (i.e., whether it is an event of interest or not) is made, based on samples from the photodetectors. There are other significant differences between the examples disclosed herein and U.S. Pat. No. 7,732,769, however the processing methods which are applied to the samples from the photodetectors can be used according to examples of the presently disclosed subject matter to determine whether an optical event is a suspected flash event. The processing of samples from the photodetectors can also provide a time reference for extracting frames from the frame buffer. For example, the samples from the photodetectors can give a temporal indication with regard to the occurrence of an optical event, and this information can be translated to an index which can be used to extract relevant images from the frame buffer.

According to examples of the presently disclosed subject matter, the determination with regard to an optical event, as to whether it is a suspected flash event (or not) (also referred to herein as the suspected flash event detection phase) can be based on samples which correspond to a majority of durations of the optical event. In a further example, the suspected flash event detection phase can be based on samples which correspond to the entire duration of the optical event, and in yet further examples, the suspected flash event detection phase can be based on samples which correspond to a duration which is longer than the duration of the optical event. With respect to any one of these examples, and by way of further examples, the validation phase can be carried out after the suspected flash event detection phase is completed. A case where the suspected flash event detection phase is based on samples which correspond to a duration which is longer than the duration of the optical event is depicted in FIG. 7, where the suspected flash event detection phase extends to t30, by which time the optical event is over. This is in contrast to U.S. Pat. No. 7,732,769, where a preliminary detection decision is required (very quickly) based on the initial rise of the flash. This translates into a significantly more demanding link budget, processing power and latency requirement than those of the present invention. This is inherent to the concept of triggering the imager, and is overcome in some examples of the presently disclosed subject matter at least by the use of continuous image capture to a buffer as described in the present invention.

When the processor determines that the optical event is a suspected flash event, an index or any other appropriate reference is determined for images extracting from the buffer. For example, signal rise and signal fall thresholds can be used to determine the rising and falling edges of the signal from the photodetectors, and can be used to determine the duration and the location on the time line of the optical event. It should be noted that according to examples of the presently disclosed subject matter, the signal rise and signal fall thresholds can be identical or different and can be predefined or dynamically adjusted.

In FIG. 7, for example, the frame reference camera exposure 101-105 can be retrieved. According to examples of the presently disclosed subject matter, using the references obtained through the processing of the photodetector samples, at least a first image which includes readings of radiation emission from the detected suspicious flash event, and at least a second image which includes readings of radiation emission which is not characteristic of the flash event are obtained.

According to examples of the presently disclosed subject matter, at least one of the images obtained, based on the processing of the photodetector samples (and the conclusion that a suspected flash event occurred), is an image which was captured prior to determination that a suspected flash event occurred. It would be appreciated that by using a frame buffer and an imaging unit that is configured to capture an image continuously, it is possible to obtain one or more images of the scene where the optical event occurred, which precede identification of the optical event as a suspected flash event, and even images which precede the optical event.

As disclosed in the example provided above, at least one of the images which are obtained (e.g., from the buffer) based on the processing of the photodetector samples can be an image which was captured prior to the determination that a suspected flash event occurred. According to examples of the presently disclosed subject matter, at least one of the images obtained from the buffer, based on processing of the photodetector samples, is an image which was captured prior to the occurrence of the optical event (which was determined to be a suspected flash event). In yet another example, at least one of the images obtained from the buffer based on the processing of the photodetector samples is an image which was captured after the optical event ended. In yet further examples, the images which are obtained from the buffer based on the processing of the photodetector samples include at least one of: an image which was captured after the optical event ended, and an image which was captured before the start of the optical event. Processing of the images, including validation and geolocation functions, have been described above.

In FIG. 7, all the retrieved images, namely camera exposures 101-105, occurred prior to the determination that a suspected flash event occurred, and camera exposure 101 occurred before the optical event which was determined to be a suspected flash event started.

According to examples of the presently disclosed subject matter, the retrieved images can be additionally processed to localize the flash event. The geolocation function can involve determining by which image pixel or by which group of adjacent pixels in an image that was captured during the occurrence of the suspected flash event, radiation from flash was represented. Once the pixel or group of adjacent pixels which represent the suspected flash event is identified, the bearing of the flash with respect to the system orientation is determined. In some examples the order in which the geolocation function and the validation function can be implemented is in any order with respect to one another. In another example, the validation function can be concluded after the geolocation function is carried out. If the latter configuration is used, the results of the geolocation function can be used by the validation function. Thus, for example, once one or more pixels (or one or more adjacent pixel groups) are geo-located, the validation function can be used to determine which, if any, of the geo-located pixels (or of the groups of adjacent pixels) is a valid event of interest. For example, as part of implementation of the geolocation function, a motion vector assisted image subtraction operation can be applied. The image subtraction operation can involve subtracting from an image or images in which the suspected flash event appears, an image in which the suspect flash event does not appear (e.g., an image taken before or after the suspected flash event). The motion vector can be used to account for an offset (e.g., a two dimensional offset) among different images, thus contributing to reduction of the residual clutter in the difference image.

Once the bearing of the suspected flash event (or if it was validated: the bearing of the event of interest) with respect to the system is known, it can be translated to a absolute bearing in geographic space by using additional data, such as location data from a GPS unit and/or a IMU unit for example. An example of a flash location function that is implemented as part of a flash detection process and using a flash detection system is disclosed for example in U.S. Pat. No. 7,732,769, Techniques to enhance the location performance were discussed above, including the use of motion vectors for background subtraction, time-dependent signal extraction from the imager and comparison with the time-dependent signals from the photodetectors, etc.

Still further according to examples of the presently disclosed subject matter, a classification function can be implemented as part of the flash detection process to provide estimation with respect to the type of flash or with respect to the source which generated the flash. The classification of the suspected flash event or of the event of interest can be based on known flash characteristics of various flash types and/or of various flash sources, such as temporal signatures and/or spectral signatures. One example of a classification function is disclosed in U.S. Pat. No. 8,421,015 to Scott et al., using wavelets analysis and other techniques.

According to examples of the presently disclosed subject matter, the identification of an event of interest and possibly also finding the location (e.g., bearing, and in some cases range) of the event of interest, and possibly also the classification of the event can be communicated to various destination points, such as a firing system, an intelligence database, a control and command center, etc.

Figure 8:
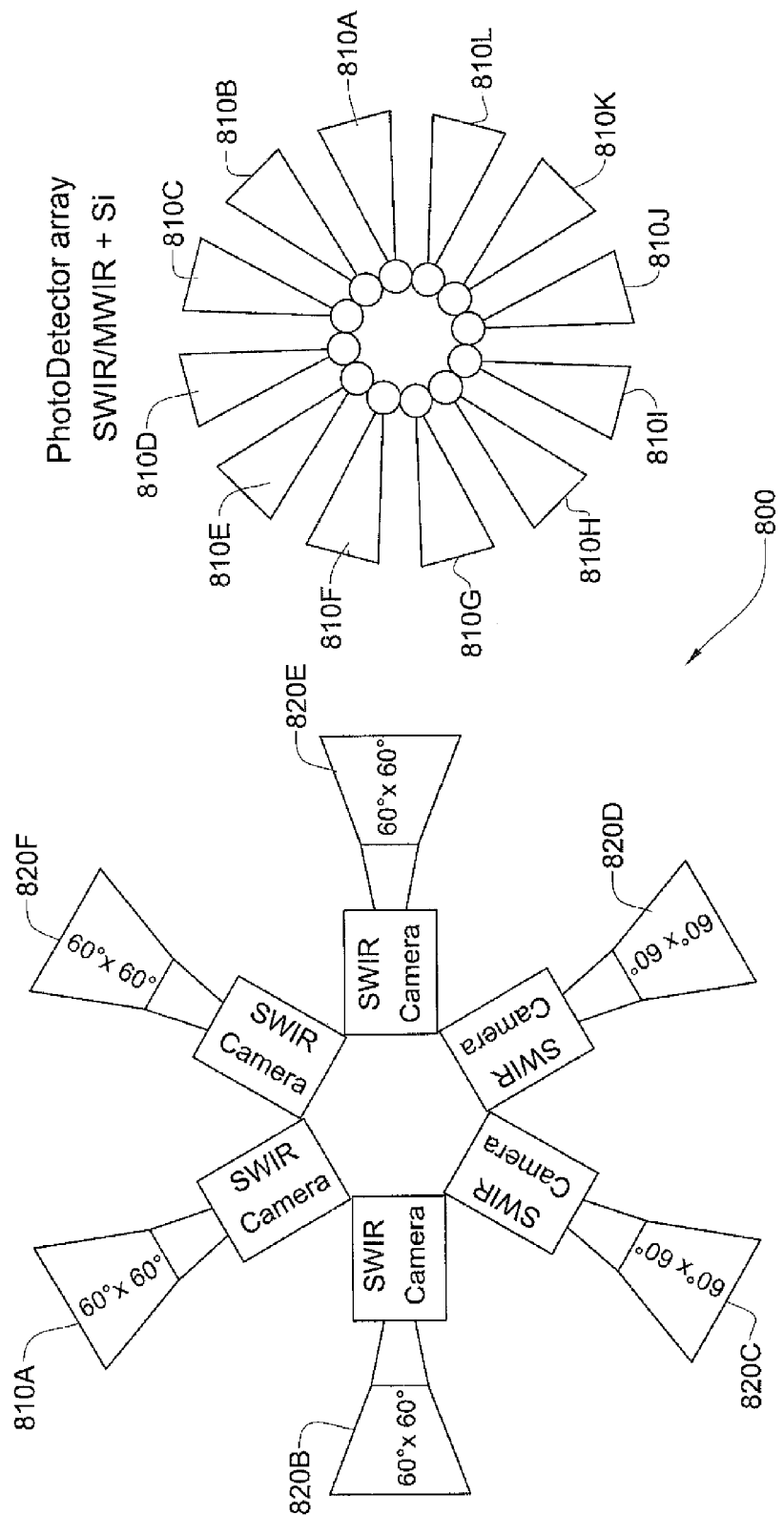
FIG. 8 is a simplified functional block diagram of a photodetectors array and a camera array which can be used in a detection system according to examples of the presently disclosed subject matter.

Reference is now made to FIG. 8, which is a simplified block diagram of a photodetectors array and a camera array which can be used in a detection system according to examples of the presently disclosed subject matter. According to examples of the presently disclosed subject matter, the detection system 800 has twelve photodetector sector units 810A-810L each capable of monitoring a 30° wide horizontal sector and monitoring the sector for visible light and SWIR or MWIR radiation. Collectively, the photodetector section units 810A-810L provide a 360° horizontal coverage.

According to examples of the presently disclosed subject matter, the detection system 800 has an imaging unit 820 that consists of six SWIR cameras 822A-822F, each covering a horizontal FOV of 60° and together providing a 360° horizontal coverage.

In the detection system 800 which is partially depicted by way of example in FIG. 8, each camera has a FOV that is covered by two photodetector sector units. Thus, according to examples of the presently disclosed subject matter, when an optical event is picked up by one of the photodetector sector units, and it is determined that the optical event is a suspected flash event, the detection system 800 (e.g., the processor) retrieves from the buffer images that were captured by the camera whose FOV covers the FOV of the photodetector sector unit that detected the suspected flash event. This can be achieved by mapping the photodetector sector units and the cameras which have overlapping FOVs, and marking or indexing the photodetector samples and the images stored in the buffer.

In further examples of the presently disclosed subject matter, since each photodetector sector unit covers only a portion of the FOV of each camera, the images retrieved from the buffer can be cropped so that it is only necessary to process the portion of the image that corresponds to the FOV of the photodetector sector unit which detected the suspected flash event which led to the retrieval of the images from the buffer. In order to enable cropping of the images, the mapping of the photodetector sector units and the cameras which was mentioned above can also include an indication as to which portion of the camera's FOV is covered by the FOV of which photodetector sector unit, and thus when detection of a suspected flash event is made, based on samples from a certain photodetector sector unit, the detection system can determine what portion of the retrieved images needs to be processed in order to the determine whether the suspected flash event is an event of interest or not.

It would be appreciated that the number of cameras and photodetector sector units, the relation between the cameras and photodetector sector units and their FOV in FIG. 8 is merely one of many possibly examples, and that other numbers and relations are contemplated according to examples of the presently disclosed subject matter.

Figure 9:
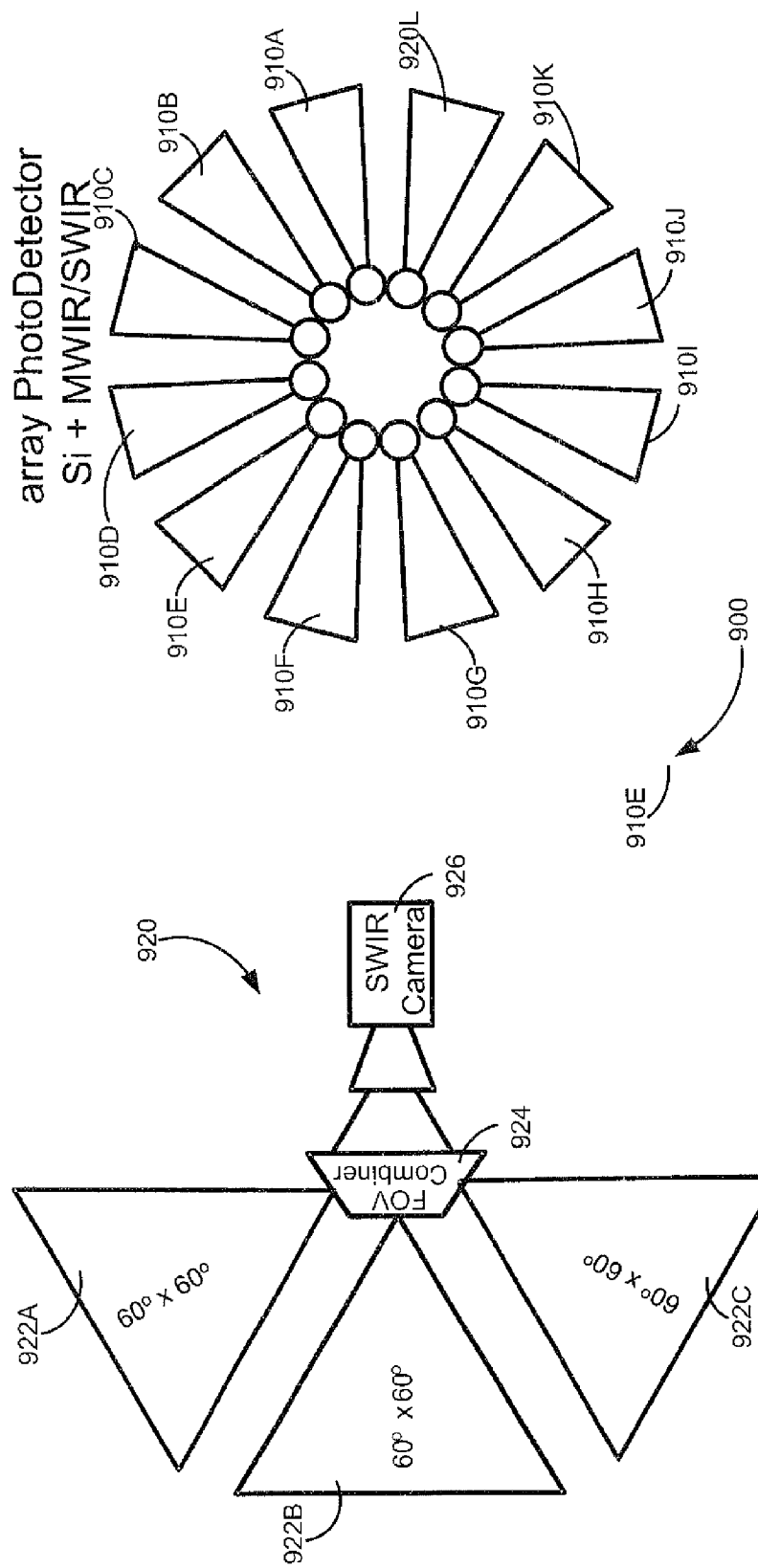
FIG. 9 is a functional block diagram illustration of a simplified block diagram of a photodetectors array and a camera array and a FOV controller, which can be used in a detection system according to examples of the presently disclosed subject matter.

Reference is now made to FIG. 9, which is a block diagram illustration of a simplified block diagram of a photodetector array, a camera array, and a FOV controller, which can be used in a detection system according to examples of the presently disclosed subject matter. In FIG. 9, the configuration of the photodetector sector units 910A-910L to the configuration of the photodetector sector units 810A-810L in FIG. 8, with each photodetector sector unit capable of monitoring a 30° wide horizontal sector, monitor the sector for visible light and SWIR or MWIR radiation. Collectively, the photodetector section units 910A-910L provide a 360° horizontal coverage.

What is different is the configuration of the imaging unit 920. The imaging unit 920 in FIG. 9 includes only 2 SWIR cameras 922A and 922B. In the optical path of each one of the SWIR cameras 922A and 922B there is a FOV combiner 924A and 924B, respectively, that superimposes three different FOVs 926A-926C and 926D-926F to form a combined FOV. Each one of the FOV combiners 924A and 924B feeds the combined FOV to a SWIR camera 922A and 922B, respectively. The SWIR camera 922A and 922B generates an image which is constructed of three superimposed FOVs 926A-926C and 926D-926F, respectively. Similar FOV combiners are presented and discussed in detail in WO2008129552. By way of example, it may be assumed that a flash occurred within the FOV of photodetector 910E. The same flash was captured by SWIR Camera 922B. The geolocation function can find the pixel in SWIR Camera 922B where the suspected flash radiation was captured. However, due to the combining function of FOV combiner 924B, there is an ambiguity in the SWIR camera 922B regarding the FOV where the flash radiation was obtained. The rough geolocation provided by the photodetector (in this case 910E) resolves this ambiguity—it is clear that the flash must have been recorded by FOV 926E and not by FOV 926D nor by FOV 926F because photodetector 910E overlaps FOV 926E alone.

There is provided according to a further aspect of the presently disclosed subject matter a system for providing a geolocation of a suspected flash event. According to examples of the presently disclosed subject matter, the system can include a frame buffer, one or more photodetectors, and a controller. The frame buffer can be capable of memorizing a sequence of high-resolution images of a scene. The one or more photodetectors can be capable of obtaining radiation emission readings from the scene. The controller can be configured to detect a suspected flash event based on processing the radiation emission readings from the one or more photo detectors, where the detection of the suspected flash event occurs at a first instant. The controller can be further configured to retrieve from the buffer high-resolution images of the scene including at least one image that was captured prior to the first instant, and is further configured to process the high-resolution images of the scene to determine a geolocation of the suspected flash event.

Still in accordance with a further aspect of the presently disclosed subject matter, there is provided a method of determining a geolocation of a suspected flash event According to examples of the presently disclosed subject matter, the method can include: memorizing a sequence of high-resolution images of a scene in a buffer; obtaining radiation emission readings from one or more photo detectors; detecting a suspected flash event based on processing the radiation emission readings from the one or more photo detectors, wherein said detecting occurs at a first instant; and retrieving from the buffer high-resolution images of the scene including at least one image that was captured prior to said first instant; and processing the high-resolution images of the scene to determine a geolocation of the suspected flash event.

It should be noted that the system for providing a geolocation of a suspected flash event and the method of determining a geolocation of a suspected flash event can be implemented based on the teaching provided above with or without the operations and configurations which were implemented to determine whether a suspected flash event is an event of interest or not.

Instead of the operations and configurations which were implemented to determine whether a suspected flash event is an event of interest or not, the system for providing a geolocation of a suspected flash event and the method of determining a geolocation of a suspected flash event include operations for determining a geolocation of an optical event that was determined to be a suspected flash event based on the processing of the radiation emission readings from the one or more photo detectors.

The configuration of the controller and the processing of the radiation emission readings from the one or more photo detectors to determine whether the reading corresponds to a suspected flash event was described in detail above, and the teachings provided above are also applicable to the system for providing a geolocation of a suspected flash event and the method of determining a geolocation of a suspected flash event which are now discussed.

The configuration of the controller and the processing of the high-resolution images, possibly in combination with the radiation emission reading from the one or more photodetectors, to determine a geolocation of an optical event was described in detail above. It is noted that in the description provided above, the optical event was a suspected flash event that was determined to be an event of interest, and in the present aspects, namely in the system for providing a geolocation of a suspected flash event and in the method of determining a geolocation of a suspected flash event, the geolocation processing does not necessarily follow a validation of the suspected flash event as an event of interest, and can be applied without such validation (i.e., when an event is determined to be a suspected flash event, but is not necessarily a validated event of interest).

Figure 10:
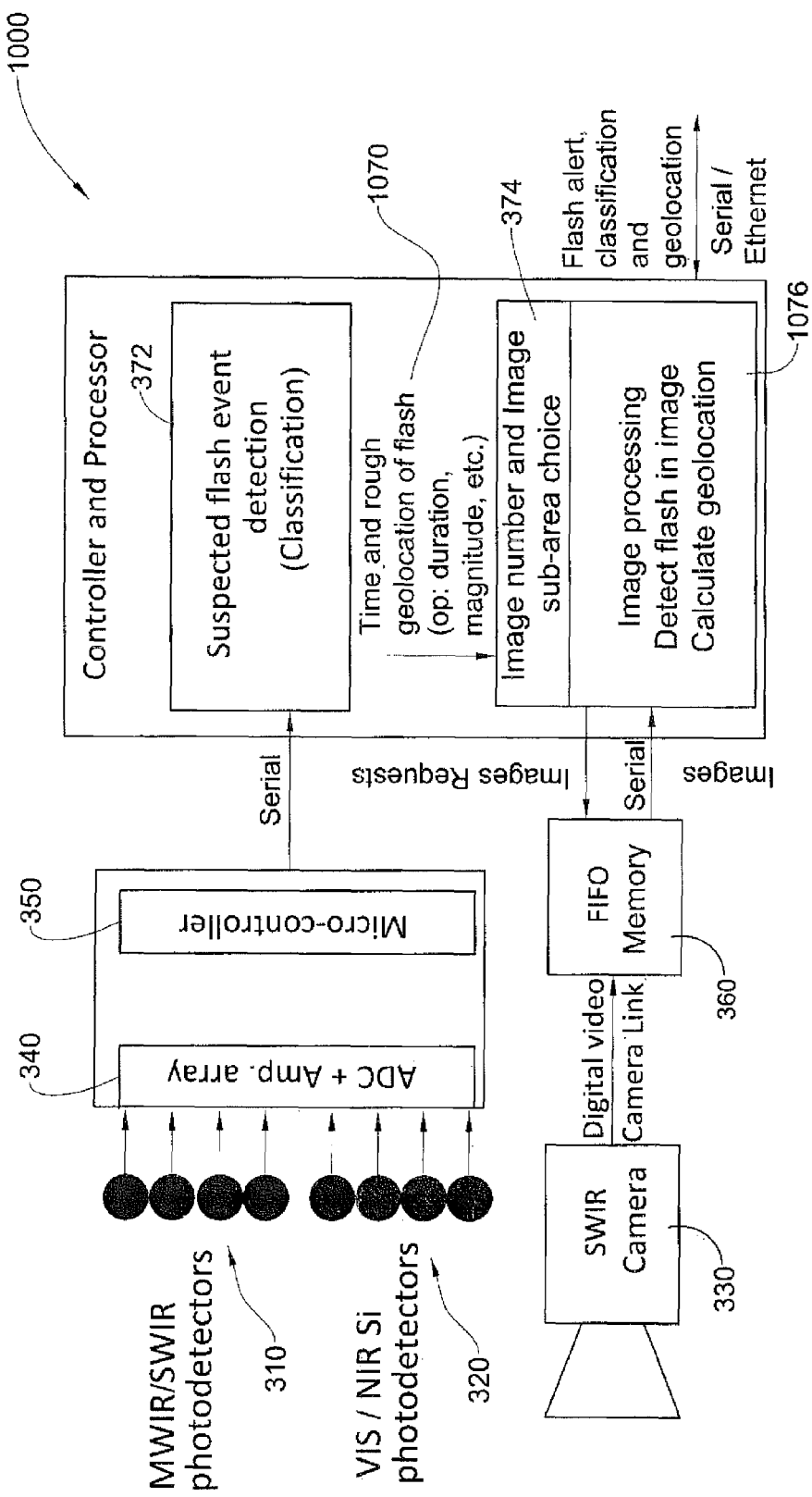
FIG. 10 is a functional block diagram illustration of one possible implementation of the system in FIG. 1, according to examples of the presently disclosed subject matter.

Reference is now made to FIG. 10 which is a block diagram illustration of one possible implementation of the system in FIG. 1, according to examples of the presently disclosed subject matter. The system in FIG. 10 (referenced 1000) is similar in structure and operation to the system shown in FIG. 3, and the features which share the same numeral as corresponding to features in FIG. 3 have similar structure and are configured in a similar manner. Accordingly, the relevant parts of the description of such features is applicable mutatis mutandis to the description of the corresponding features in FIG. 10. Notwithstanding the above, it should be noted, that while the capabilities and configurations of features in FIG. 10 and their counterparts in FIG. 3 can be similar or events may be identical, it can also be different within the range of possibilities set forth in the description of such features provided above. For example, the suspected flash event criterion that is used by the controller component 372 is not necessarily identical when it is used in the context of the system shown in FIG. 3 compared to the definition of the same criterion when used in the context of the system shown in FIG. 10. Thus for example, in the case of the system shown in FIG. 10, the criterion can include parameters which put stronger emphasis on certain characteristics of the optical event under evaluation, whereas other characteristics are more salient in the criterion that is employed by the system shown in FIG. 3.

In a similar manner, the geolocation module 1076 in FIG. 10 implements a geolocation function or procedure, such as described above, for example, with reference to FIG. 3, but according to the present aspect of the presently disclosed subject matter system the geolocation module 1076 and the geolocation process implemented by the geolocation module 1076 do not necessarily involve or require that the detected suspected flash event is validated as an event of interest. In this aspect, for example, it can be assumed that the suspected flash event is an event of interest. Further by way of example, a validation phase such as the one described above, in which a detected suspected flash event is evaluated to determine whether it is an event of interest or not can be implemented by the controller 1070.

As is shown in FIG. 10, block 1076 which is a component or a module of the controller 1070 is configured to implement the geolocation function or process, and the validation phase is not required.

Figure 11:
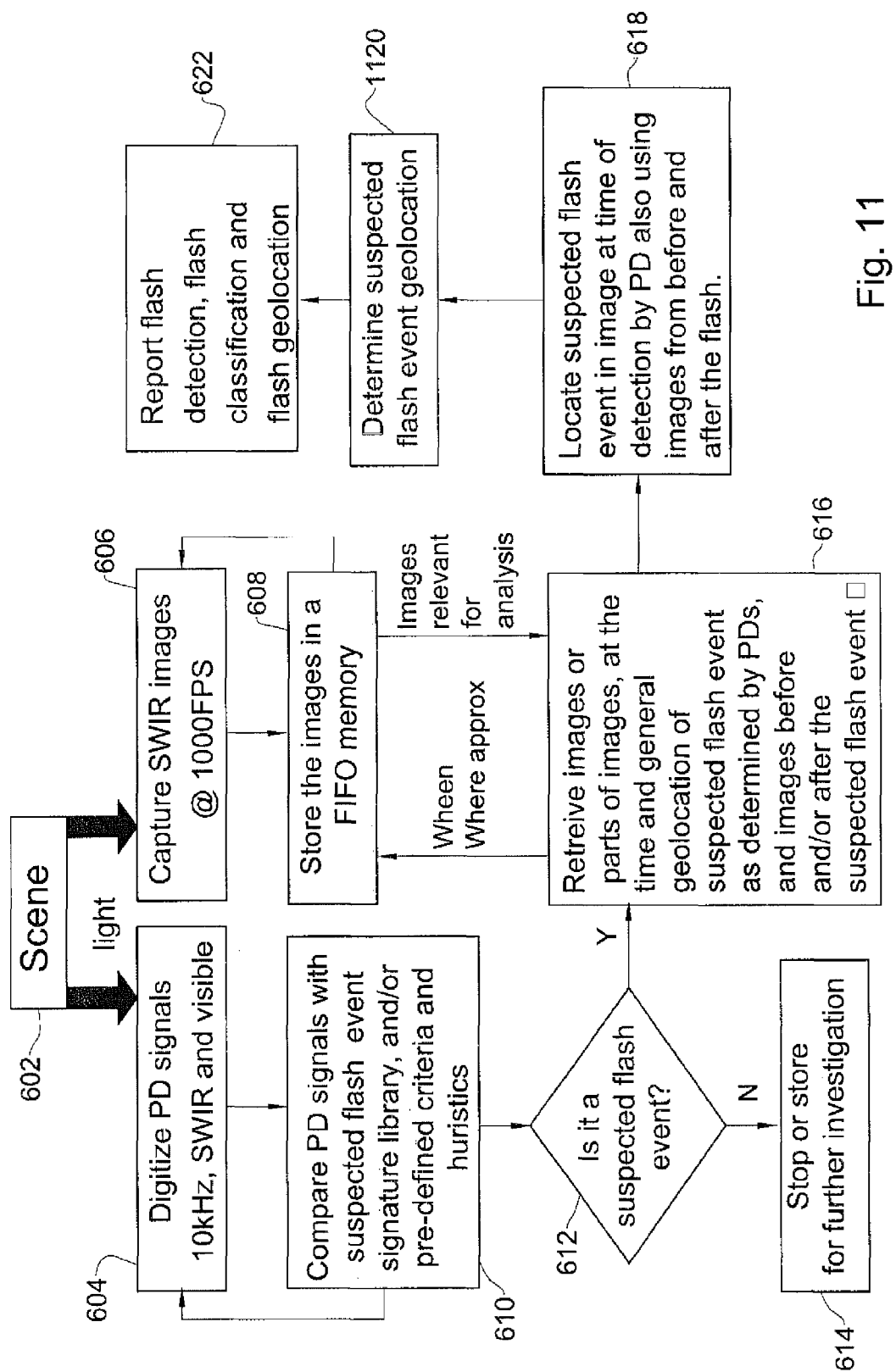
FIG. 11 is a flowchart illustration of a method of determining a geolocation of an optical event according to examples of the presently disclosed subject matter.

Reference is now made to FIG. 11, which is a flowchart illustration of a method of determining a geolocation of an optical event according to examples of the presently disclosed subject matter. The method illustrated in FIG. 11 includes operations which are similar to those illustrated in FIG. 6, and which were described above with reference to FIG. 6. The operations in FIG. 11 which share the same numeral as corresponding operations in FIG. 6 are similar and the relevant description which was provided above in particular with reference to the corresponding operations is applicable mutatis mutandis to the operations of the method shown in FIG. 11. Notwithstanding the above, it should be noted, that some difference can exist within the range of possibilities set forth in the description of the corresponding operations provided above. In addition, as can be seen in FIG. 11, the method of determining a geolocation of a suspected flash event includes, at block 1120, determining a geolocation of a suspected flash event. The geolocation determination operation does not require a validation phase, whereby a suspected flash event is evaluated using hi resolution images obtained from an image buffer to determine whether the suspected flash event is an event of interest or not (block 620 in FIG. 6), although in some examples, such an operation can also be implemented as part of the method of determining a geolocation of an optical event.

It will also be understood that the systems described herein may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method comprising:
    continuously storing a high-resolution image of a scene in a buffer to form a sequence of the high-resolution images of the scene in the buffer;
    obtaining radiation emission readings from one or more photo detectors;
    detecting a suspected flash event based on processing the radiation emission readings obtained from the one or more photo detectors, wherein the detecting occurs at a first instant;
    retrieving, from the buffer, high-resolution images of the scene including at least one image that was captured prior to the first instant; and
    processing the high-resolution images of the scene to determine a geolocation of the suspected flash event, wherein the processing includes processing based on the at least one image that has been captured prior to the first instance.

2. The method according to claim 1, further comprising operating a high-resolution camera which captures the high-resolution images independently from the photodetectors, and independently from the detection of the suspected flash event.

3. The method according to claim 2, further comprising capturing the high-resolution images continuously, regardless of the detection of the suspected flash event.

4. The method according to claim 2, wherein capturing the high-resolution images comprises operating the high-resolution camera with an inter-exposure interval that is shorter than the shortest possible pulse duration of a suspected flash event.

5. The method according to claim 2, wherein
    capturing the high-resolution images comprises operating the high-resolution camera at a wavelength band which is different from a wavelength band at which any one of the one or more photo detectors operate,
    the method further comprises determining whether the suspected flash event is an event of interest or not, and
    the determining whether the suspected flash event is an event of interest or not includes cross wavelength band processing.

6. The method according to claim 1, further comprising determining based on the processing of the radiation emission readings obtained from the one or more photo detectors, and based on a processing of the retrieved images, whether the suspected flash event is an event of interest or not.

7. The method according to claim 1, wherein the obtaining of the radiation emission readings from the one or more photo detectors comprises obtaining a plurality of radiation emission readings from the one or more photo detectors during a flash duration, and comparing attributes of the plurality of radiation emission readings to a library of flashes.

8. The method according to claim 1, wherein
radiation from at least two field of views (FOVs) is superimposed to provide a single high-resolution image, and
the geolocation of the suspected flash event is determined using information about a rough geolocation obtained from the one or more photo detectors which provided the radiation emission readings.

9. The method according to claim 1, wherein
the forming of the sequence of the high-resolution images includes storing a timestamp for each of the high-resolution images, and
the retrieving of the high-resolution images is based on the stored timestamps of the respective images to thereby obtain at least one image that was captured prior to the first instant.

10. The method according to claim 1, wherein the at least one image that was captured prior to the first instant includes at least an image whose capturing is initiated prior to the first instant.

11. A system comprising:
a frame buffer configured to continuously store a high-resolution image of a scene to form a sequence of high-resolution images of the scene in the frame buffer;
one or more photodetectors configured to obtain radiation emission readings from the scene; and
a controller configured to:
  detect a suspected flash event based on processing the radiation emission readings obtained from the one or more photo detectors, wherein the detecting occurs at a first instant;
  retrieve, from the frame buffer, high-resolution images of the scene including at least one image that was captured prior to the first instant; and
  process the high-resolution images of the scene to determine a geolocation of the suspected flash event, wherein the processing includes processing based on the at least one image that has been captured prior to the first instance.

12. The system according to claim 11, further comprising a high-resolution camera which is configured to capture the high-resolution images independently from the photodetectors, and independently from the detection of the suspected flash event.

13. The system according to claim 12, wherein the high-resolution camera is configured to capture the high-resolution images continuously, regardless of the detection of the suspected flash event.

14. The system according to claim 12, wherein the high-resolution camera is configured to have an inter-exposure interval that is shorter than the shortest possible pulse duration of a suspected flash event.

15. The system according to claim 12, wherein
the high-resolution camera is configured to operate at a wavelength band which is different from a wavelength band at which any one of the one or more photo detectors operate, and
the determining of the geolocation of the suspected flash event by the controller comprises cross wavelength band processing by the controller.

16. The system according to claim 11, wherein the controller is further configured to determine, based on the processing of the radiation emission readings obtained from the one or more photo detectors, and based on a processing of the retrieved images, whether the suspected flash event is an event of interest or not.

17. The system according to claim 11, wherein
each of the one or more photo detectors are configured to obtain a plurality of radiation emission readings from the one or more photo detectors during a flash duration, and
the controller is further configured to compare attributes of the plurality of radiation emission readings to a library of flashes.

18. The system according to claim 11, wherein
radiation from at least two field of views (FOVs) is superimposed to provide a single high-resolution image, and
the controller is further configured to determine the geolocation of the suspected flash event using information about a rough geolocation obtained from the one or more photo detectors which provided the radiation emission readings from the scene.

19. The system according to claim 11, wherein
the forming of the sequence of the high-resolution images includes storing a timestamps for each of the high-resolution images, and
the controller is further configured to retrieve the high-resolution images based on the stored timestamps of the respective images to thereby obtain said at least one image that was captured prior to the first instant.

* * * * *